United States Patent
Burke et al.

(10) Patent No.: US 12,503,611 B2
(45) Date of Patent: Dec. 23, 2025

(54) GLASS-CERAMIC THERMAL PAINT SYSTEM AND METHOD USING UV:VIS SPECTROSCOPY

(71) Applicant: UNIVERSITY OF RHODE ISLAND BOARD OF TRUSTEES, Kingston, RI (US)

(72) Inventors: Noah Burke, Cumberland, RI (US); Panagiotis Panoutsopoulos, Middletown, RI (US); Zachary Ahlquist, Cranston, RI (US); Otto J. Gregory, Point Judith, RI (US)

(73) Assignee: University of Rhode Island Board of Trustees, Kingston, RI (US)

( * ) Notice: Subject to any disclaimer, the term of this patent is extended or adjusted under 35 U.S.C. 154(b) by 433 days.

(21) Appl. No.: 18/316,280

(22) Filed: May 12, 2023

(65) Prior Publication Data
US 2023/0365818 A1 Nov. 16, 2023

Related U.S. Application Data

(60) Provisional application No. 63/341,211, filed on May 12, 2022.

(51) Int. Cl.
*C09D 5/26* (2006.01)
*C09D 7/61* (2018.01)
(Continued)

(52) U.S. Cl.
CPC .......... *C09D 5/26* (2013.01); *C09D 7/61* (2018.01); *C09D 101/26* (2013.01); *G01K 1/022* (2013.01); *G01K 11/125* (2013.01)

(58) Field of Classification Search
CPC .......... C09D 5/26; C09D 7/61; C09D 101/26; G01K 1/022; G01K 11/14; G01K 11/125; G01K 3/06
See application file for complete search history.

(56) References Cited

U.S. PATENT DOCUMENTS

5,135,795 A 8/1992 Gregory et al.
5,338,566 A 8/1994 Gregory et al.
(Continued)

FOREIGN PATENT DOCUMENTS

EP 1944340 A2 * 7/2008 ............... C09D 7/61
EP 3026410 B1 1/2019
(Continued)

OTHER PUBLICATIONS

Computer translation of WO2014027162A1 (Year: 2025).*
(Continued)

*Primary Examiner* — Randy W Gibson
(74) *Attorney, Agent, or Firm* — Hinckley Allen & Snyder; Stephen Holmes

(57) ABSTRACT

Temperature measurements are critical in gas turbine engine design but difficult to obtain due to the extreme environment. Temperature indicating paints (thermal paints) have been used for decades to map maximum temperature fields on superalloy components but have numerous weaknesses. Disclosed herein are novel glass ceramic thermal paints that undergo viscous flow sintering to indicate temperatures up to 1000° C., with high resolution (±5° C.), by an optical transition. Disclosed paint formulations are designed to adhere to Nickel-based superalloys or SiC—SiC ceramic matrix composites (CMC) by closely matching coefficients of thermal expansion and may function for times above 60 hours. By utilizing automation and a UV:VIS spectrometer, quantitative temperature maps can be generated for easy comparison to theoretical models. A transient sintering energy model is disclosed to recover full thermal history information.

14 Claims, 22 Drawing Sheets

(51) Int. Cl.
  *C09D 101/26* (2006.01)
  *G01K 1/022* (2021.01)
  *G01K 11/125* (2021.01)

(56) References Cited

U.S. PATENT DOCUMENTS

| | | | |
|---|---|---|---|
| 8,436,311 | B2 | 5/2013 | Shelley et al. |
| 2011/0108731 | A1 | 5/2011 | Shelley et al. |
| 2012/0092665 | A1 | 4/2012 | Vahey et al. |
| 2014/0098836 | A1 | 4/2014 | Bird |
| 2024/0067829 | A1* | 2/2024 | Jordan .............. F02F 3/12 |
| 2024/0141179 | A1* | 5/2024 | Mehr .............. C09D 1/00 |

FOREIGN PATENT DOCUMENTS

| | | | | |
|---|---|---|---|---|
| GB | 2595866 | A | * 12/2021 | ............ G01K 11/20 |
| WO | WO-2014027162 | A1 | * 2/2014 | ............ G01K 11/20 |

OTHER PUBLICATIONS

Rabhiou, A., Feist, J., Kempf, A., Skinner, S., & Heyes, A. (2011). Phosphorescent thermal history sensors. Sensors and Actuators A: Physical. 169. 18-26. 10.1016/j.sna.2011.04.022.

Agazhanov, A. SH, Samoshkin, D. A., & Kozlovskii, Y. M. (2019). Thermophysical properties of Inconel 718 alloy. Journal of Physics: Conference Series. 1382. 012175. 10.1088/1742-6596/1382/1/012175.

Arulprakasajothi, M., & Rupesh, P. L. (2020). Surface temperature measurement of gas turbine combustor using temperature-indicating paint, International Journal of Ambient Energy, DOI: 10.1080/01430750.2020.1731709.

Bengtson, M., Maxwell, J., Hoffmann, R., Cooper, R., Schieffer, S., Ferguson, D., Johnston, W.R., Cowardin, H., Plis, E., & Engelhart, D. (2018). Optical Characterization of Commonly Used Thermal Control Paints in a Simulated GEO Environment, The Advanced Maui Optical and Space Surveillance Technologies Conference.

Burke, N., Panoutsopoulos, P., & Gregory, O. J. (2023). An optical technique based on silicate glass sintering for temperature mapping. International Journal of Applied Glass Science. 14. 10.1111/ijag.16625.

Fair, G. E., Kerans, R. J., & Parthasarathy, T. A. (2008). Thermal history sensor based on glass-ceramics. Sensors and Actuators A: Physical. 141. 245-255. 10.1016/j.sna.2007.08.031.

Gregory, O. J. & Tao You. "Ceramic temperature sensors for harsh environments." IEEE Sensors Journal 5, 5 (2005): 833-838. doi: 10.1109/JSEN.2005.844346.

Kitagawa, A., Welsh, C., Mackilligin, H., & Licence, P. (2022). Diffuse Reflection Infrared Fourier Transform Spectroscopy and Partial Least Squares Regression Analysis for Temperature Prediction of Irreversible Thermochromic Paints. Applied spectroscopy, 76(5), 531-540. https://doi.org/10.1177/00037028211065759.

Lee, K. N., Pilgrim, C., Araguas Rodriguez, S., Ferran-Marqués, M., & Feist, J. (2019). Thermal History Mapping Technology for Turbine Engine Diagnostics. 10.13140/RG.2.2.17999.23204.

Lempereur, C., Andral, R., & Prudhomme, J. Y. (2008). Surface Temperature Measurements on Engine Components by Means of Irreversible Thermal Coating. Measurement Science and Technology. 19. 105501. 10.1088/0957-0233/19/10/105501.

Neely, A. J., Riesen, H., Kruger, K., Choudhury, R., Appleton, J., Tracy, P., Tjong, W., Yesil, A., Paukner, D., Clark, R., & Cameron, H. (2010). Permanent-Change Thermal Paints for Hypersonic Flight-Test. 50.

Peral, D., Zaid, A., Benninghoven, C., Araguás-Rodríguez, S., Kluß, D., Karagiannopoulos, S., Krewinkel, R., & Feist, J.P. (Jul. 21, 2022). "High-Resolution Thermal Profiling of a Combustor in a Non-Dedicated Test Using Thermal History Coatings." ASME. J. Turbomach. Nov. 2022; 144(11): 111007. https://doi.org/10.1115/1.4054635.

Pilgrim, C. "Progress on luminescence coatings for temperature mapping on turbine engines" in "Thermal Barrier Coatings V", Prof. Dr. Robert Vaßen, Forschungszentrum Jülich GmbH, Germany Brian Hazel, Pratt & Whitney, USA Prof. Dr. Uwe Schulz, German Aerospace Center, Germany Dr. Michael J. Maloney, Pratt & Whitney, USA Dr. Ram Darolia, GE Aviation (Retired), USA Eds, ECI Symposium Series, (2018). http://dc.engconfintl.org/tbcv/69.

Reyes, J. A., Hoffmann, R. C., Engelhart, D. P., Cowardin, H. M., Cone, D. (Dec. 9, 2019). Spectroscopic behavior of composite, black thermal paint, solar cell, and multi-layered insulation materials in a GEO simulated environment. NASA Technical Reports Server (NTRS). https://ntrs.nasa.gov/citations/20190033943.

Araguás-Rodríguez, S., Jelínek, T., Michálek, J., Yáñez González, Á., Schulte, F., Pilgrim, C., Feist, J., & Skinner, S. J. (2018). Accelerated thermal profiling of gas turbine components using luminescent thermal history paints. Journal of the Global Power and Propulsion Society, 2, pp. 344-361. https://doi.org/10.22261/JGPPS.S3KTGK.

Rupesh P. L., & Arulprakasajothi (2020). Thermal Distribution on Gas Turbine Blade Using Thermal Paint.

Stevens, M., & Carty, W. M. (2022). The role of heating rate on the sintering of glass powders. International Journal of Applied Glass Science. 13. 10.1111/ijag. 16576.

Trottier, C.M. (1991). Temperature Indication Based on the Sintering of Glass-Ceramics. University of Rhode Island.

Yang, J. (2013). A silicon carbide wireless temperature sensing system for high temperature applications. Sensors (Basel, Switzerland), 13(2), 1884-1901. https://doi.org/10.3390/s130201884.

Yang, L. & Zhi-Min, L. (2015). The Research of Temperature Indicating Paints and its Application in Aero-engine Temperature Measurement. Procedia Engineering. 99. 1152-1157. 10.1016/j.proeng.2014.12.697.

* cited by examiner

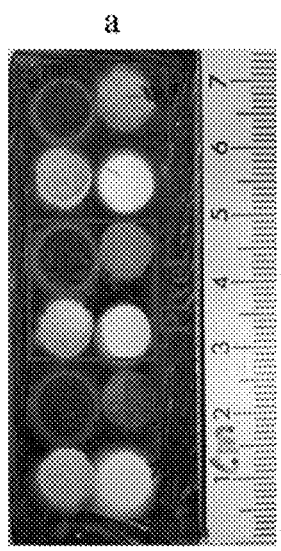 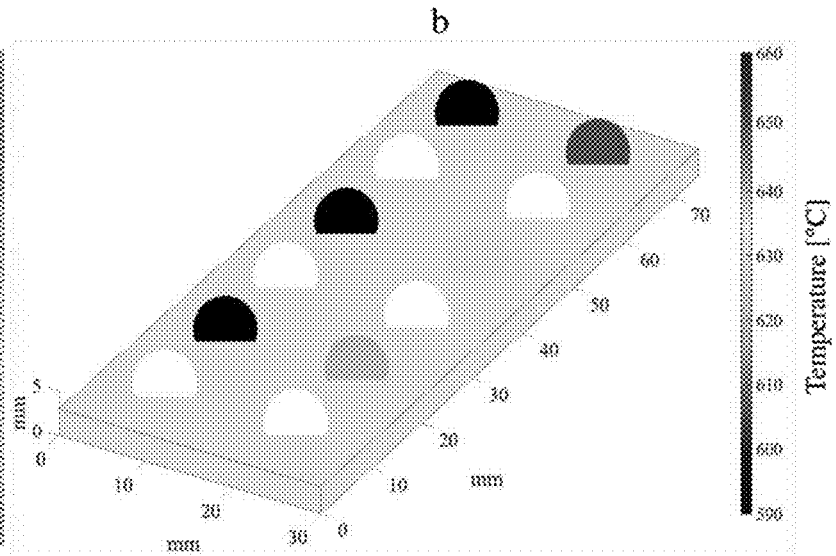
FIG. 18A    FIG. 18B
| GL-1734 Temperature > 420°C | GL-1705 Temperature = 635°C |
|---|---|
| GL-1862 Temperature < 730°C | GL-1850 Temperature < 950°C |
FIG. 19

| | Time [hours] | Temperature [°C] | Sintering Energy (E) [a.u.] |
|---|---|---|---|
| Path A | 0.167 | 639 | 0.7572 |
| | 0.33 | 634 | 0.7574 |
| Path B | 1 | 628 | 0.7570 |
| | 3 | 621 | 0.7571 |
| Path C | 8 | 615 | 0.7561 |
| | 18 | 610 | 0.7550 |
| | 60 | 610 | 0.7527 |

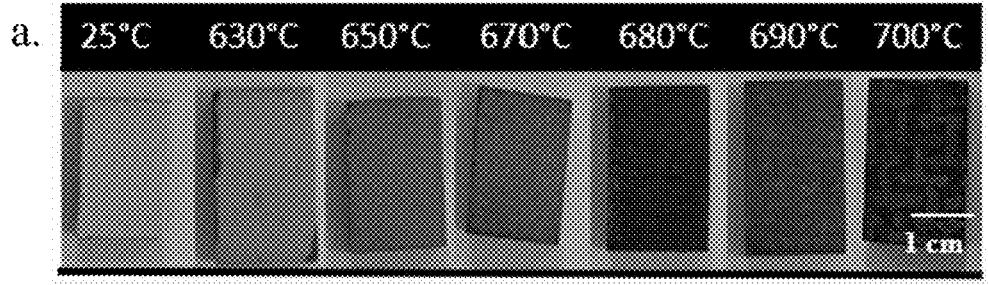
FIG. 32A
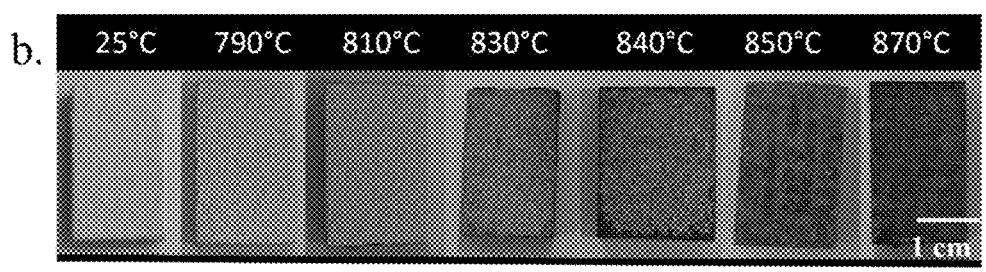
FIG. 32B
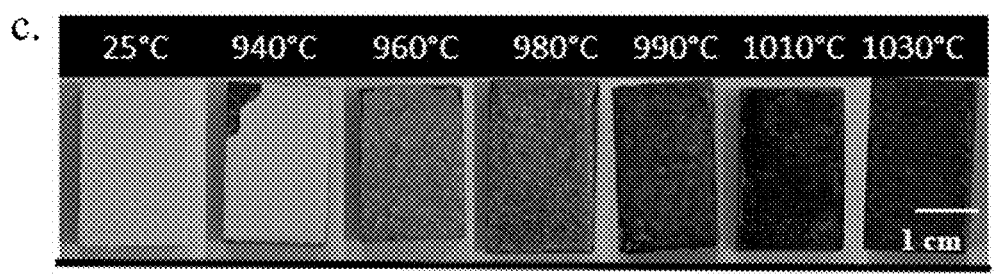
FIG. 32C
| Thermal paint | 30-Minutes | 4-Hour | 32-Hours |
|---|---|---|---|
| URI-TP-665 | 630°C - 700°C | 610°C - 680°C | 590°C - 660°C |
| URI-TP-835 | 790°C - 870°C | 750°C - 830°C | 720°C - 800°C |
| URI-TP-990 | 940°C - 1030°C | 920°C - 1010°C | 890°C - 980°C |
FIG. 33

| Thermal Paint | Exposure Time [hours] | Reflectivity [%] | Transition state [powder or glassy] | 3D Surface Temperature [°C] | Thermocouple Temperature [°C] |
|---|---|---|---|---|---|
| URI-TP-665 | 0.15 | 70.3 | Glassy | 698 | 700 |
| URI-TP-665 | 5.0 | 65.8 | Powder | 631 | 630 |
| URI-TP-835 | 2.5 | 48.1 | Glassy | 827 | 825 |
| URI-TP-835 | 28.0 | 59.0 | Powder | 792 | 790 |
| URI-TP-835 | 16.0 | 47.8 | Powder | 799 | 800 |
| URI-TP-990 | 1.0 | 56.2 | Powder | 951 | 950 |
| URI-TP-990 | 1.0 | 55.4 | Glassy | 1003 | 1000 |
FIG. 37
FIG. 38A
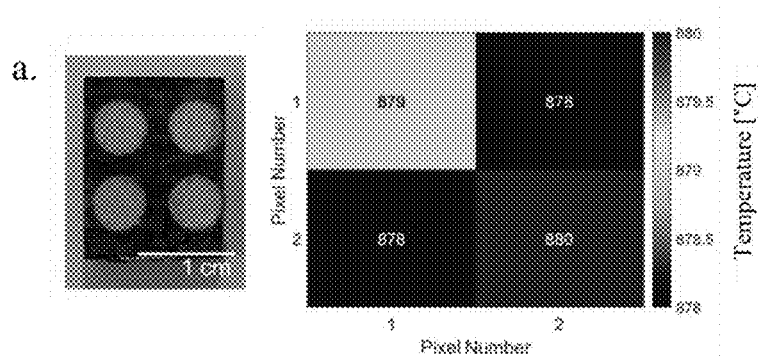
FIG. 38B
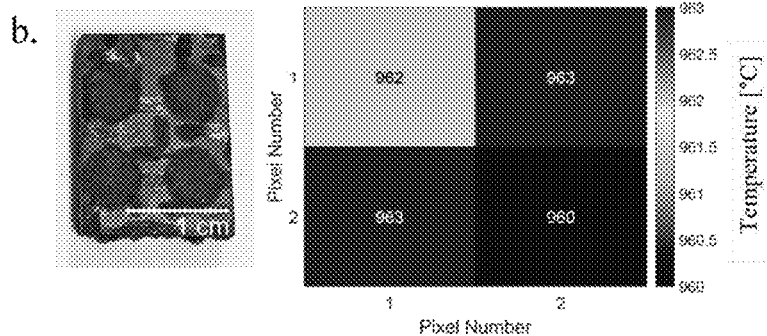
FIG. 38C
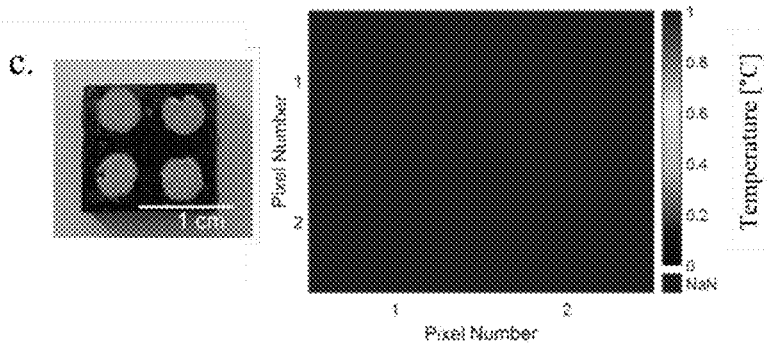

| Thermal Paint | Time [hours] | Reflectivity [%] | Transition State [powder or glassy] | 3D Surface Temperature [°C] | Thermocouple Temperature [°C] |
|---|---|---|---|---|---|
| URI-TP-835 | 48.0 | 89.4, 92.4, 92.3, 88.4 | power | 879, 878, 878, 880 | 880 |
| URI-TP-990 | 1.25 | 41.2, 40.1, 39.7, 43.4 | powder | 962, 963, 963, 960 | 960 |
| URI-TP-835 | 0.5 | 99.8, 100.2, 99.6, 99.7 | powder | NaN, NaN, NaN, NaN | 550 |
FIG. 39
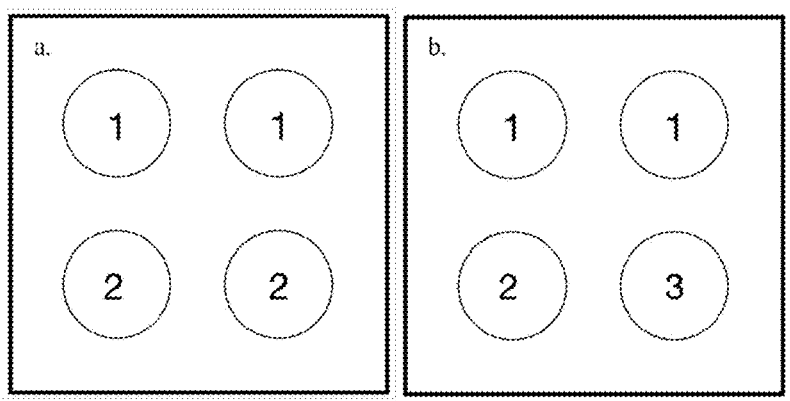
FIG. 40
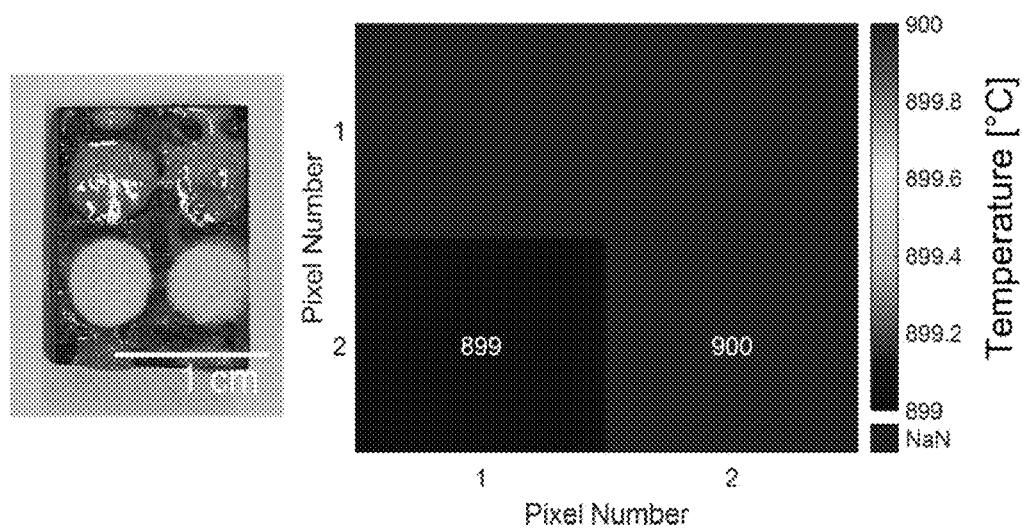
FIG. 41

| Thermal Paint | Time [hours] | Reflectivity [%] | Transition State [powder or glassy] | 3D Surface Temperature [°C] | Thermocouple Temperature [°C] |
|---|---|---|---|---|---|
| URI-TP-665/990 | 9.0 | 135, 142, 88.9, 87.6 | glassy (upper row) powder (lower row) | NaN, NaN, 899, 900 | 900 |
| URI-TP-665/990/835 | 2.0 | 128, 136, 48.4, 104 | glassy (upper row) powder (lower left) glassy (lower right) | NaN, NaN, 951, NaN | 950 |

GLASS-CERAMIC THERMAL PAINT SYSTEM AND METHOD USING UV:VIS SPECTROSCOPY

CROSS-REFERENCE TO RELATED APPLICATIONS

This Non-Provisional patent application claims the benefit of U.S. Provisional Patent Application No. 63/341,211 filed May 12, 2022, and entitled Glass Ceramic Thermal Paint System, the entire contents of which is incorporated herein by reference.

FIELD OF THE INVENTION

The present disclosure generally relates to thermal paints and methods for interpreting the spectral response from irreversible changes that occur in thermal paints when mapping surface temperatures. More specifically, the present disclosure provides a method and thermal paint system to map the time-history of the maximum temperature of a thermal paint or thermal paints across a surface. The method and system of the present disclosure generates high-resolution quantitative thermal maps across a surface to which a thermal paint(s) has/have been applied.

BACKGROUND OF THE DISCLOSURE

From a thermodynamic perspective, the gas turbine is a simple heat engine converting chemical potential energy to mechanical work powering our world. From a design perspective, these engines present an ever-evolving challenge to enhance performance, increase efficiency, and improve reliability. The goal in designing a gas turbine is to maximize thermodynamic efficiency while keeping costs low and adhering to stringent environmental regulations. What follows are extreme operating conditions and complex designs made of exotic refractory materials.

Modern gas turbines operate at temperatures upwards of 2000° C., nearly twice as hot as lava, and are subject to forces exceeding 50,000 g. Ordinary alloys like steel or aluminum melt at these conditions. Therefore, nickel-based superalloys, such as Inconel 718, are the predominant material used in construction of the engine hot section for their exceptional thermomechanical properties. Future engines will rely on SiC—SiC Ceramic Matrix Composites (CMC) and may eventually replace superalloys as they are refractory and have superior thermomechanical properties.

Accurate and reliable surface temperature measurements are critical to many aspects of engine design. However, due to the extreme nature of the environment, these measurements remain a challenge. Many temperature sensing technologies have been developed to meet this demand, the most common being thermocouples, optical pyrometry, and temperature indicating paints (thermal paints).

Thermal paints act as a passive, wireless, irreversible temperature sensor by indicating maximum temperature through qualitative transitions in color. The major benefit of thermal paints is their ability to profile the full temperature field as opposed to point measurements of temperature. Although thermal paints have been used in gas turbines for decades, they have limitations: poor adhesion, small temperature ranges, low resolution, lack quantitative results, and are only capable of indicating maximum temperature.

DISCUSSION OF PRIOR ART

Thermocouples remain the gold standard in temperature measurement for their precise resolution, large temperature range, and simplicity. Thermocouples take advantage of the Seebeck effect, where an electrical potential is created when two ends of a wire are at different temperatures. Temperature is derived from the voltage measured in the circuit of the known materials. Conventional thermocouples are not ideally suited for the engine environment due to their mass and bulkiness.

Thin film thermocouples provide considerable advantage over conventional thermocouples for gas turbine applications. First, their thickness is on the order of a few micrometers and will not adversely affect the flow pattern of gasses through the engine. Second their low thermal mass (μg) yields faster response times (<1 μs) and negligible affects from vibrational modes of rotating components. Third, being directly deposited onto the surface of a component eliminates the need for high temperature adhesives, while simultaneously increasing measurement accuracy.

Wireless thermocouples are non-intrusively embedded on components and transmit data to a receiver outside the engine. They are best used in locations where routing wires to an outside data acquisition system is too difficult. However, current wireless thermocouples are unable to operate under the same temperatures and forces associated with traditional wired thermocouples. The inherent disadvantage of thermocouples is the inability to map surface temperatures due to the low spatial resolution of point measurement.

Optical Pyrometry is line of sight method used for surface temperature measurement by means of thermal radiation emitted by the object. The intensity of radiant energy from an object is compared to a calibrated incandescent filament for temperature measurement. Pyrometry has unique attributes such as: no upper limit of temperature detection, instantaneous response time, and non-contact measurements. Current pyrometry techniques can map steady state and transient surface temperatures with resolution rivaling thermocouples and operate on blades rotating at 14,000 rpm. The greatest challenge of pyrometry is installing the device with proper line of sight while preserving spot size, accuracy, resolution, and not disturbing the operation of the engine itself. This is nearly impossible in the combustor section where temperatures are the highest and access is restricted.

Temperature indicating paints, or thermal paints, globally map maximum temperature inside gas turbine engines by undergoing transitions in color due to chemical reactions. Thermal paints are sprayed onto a component in the engine without need for line of sight or wire routing. This is most beneficial in relatively inaccessible regions, such as the combustor liner, or regions at high velocity, such as blades. However, Thermal paints often experience poor adhesion. This is a critical problem, because if the paint does not stick to the surface during engine tests there is no measurement. Most thermal paints also rely on an operator's interpretation of color, as opposed to an analytical technique for temperature measurement and thus, have relatively low resolution. Temperature range is another problem for thermal paints when they cannot detect the full spectrum of temperatures in the gas turbine and are heavily influenced by the time at high temperature. The intrinsic disadvantage of thermal paints is their irreversible transition, i.e. they are only able to give information regarding maximum temperature, unlike thermocouples which record the full thermal history.

Accordingly, there is a need to interpret thermal paint data quantitatively to increase temperature range and resolution and eliminate subjective interpretation. A 3D scanner has been used to capture the color of thermal paints on components, compare to calibration data, and generate maximum surface temperature maps digitally overlayed on engine components This technique increased resolution to 10° C. for some paints and 100° C. for others. In hypersonic flight testing, thermal paints are sprayed on the surface of a vehicle to measure maximum temperature due to drag forces. The paint undergoes color changes in response to temperature and was captured quantitatively using a spectrophotometer. The technique seems promising, however, the thermal paints chosen only function at low temperature for short times (<700° C. & <15 min), which is problematic for gas turbine applications. Phosphor based thermal paints have been developed that undergo permanent changes in their luminescent properties as opposed to optical properties for temperature indication. These coatings are capable of quantitative temperature measurement upwards of 1400° C., with high resolution, for long periods of time (>4500 hours) and have been proven to work in non-dedicated engine tests. However, questions remain about the adhesion to engine components, the effects transient temperature, and if absolute temperature can be recovered from the phosphor based thermal paints.

A second type of thermal paint, known as a thermal fuse, indicates if temperature has exceeded a particular value with high resolution. Thermal fuses utilize the sintering of glass-ceramics to indicate temperature by a transition in color, opacity, and texture. They are best used in diagnostic testing to validate that an engine is operating within design parameters and not for full thermal mapping due to their limited temperature range. A thermal history sensor, also based on the sintering of glass-ceramics, functions in a capacity far beyond thermal fuses. They can report information regarding thermal excursions to monitor the health of operational gas turbines. The sintering of glass-ceramics has been used for diagnostic testing and the work here proposes adapting it for use in thermal mapping.

Sintering:

Sintering is the coalesce of discrete metal or ceramic particles to form a single solid state while simultaneously eliminating porosity. Sintering is often used as a processing technique to fabricate advanced ceramics with superior mechanical and optical properties. Many variables affect sintering and can be divided into two categories: material and environmental. Material variables include chemical composition, powder shape, size, and distribution. Environmental variables are the conditions the powder is exposed to such as temperature, time, pressure, atmosphere . . . etc. Sintering occurs in three stages and is initiated at a temperature between $$\frac{1}{2} \text{ and } \frac{2}{3}$$

of the absolute melting temperature of the powder.

During solid-state sintering pores are gradually eliminated as the individual powder grains melt and spread until appearing as a solid glassy surface. The effects of sintering on microstructure further give rise to changes in the optical properties.

Viscous materials like glass follow a viscous flow sintering mechanism as in Equation (1).

$$\frac{\Delta l}{l_0} \approx \frac{\gamma_s}{\mu r} t \tag{1}$$

Where $\Delta l$ is the change in length of the glass, $l_0$ is the initial length of the glass, $\gamma_s$ is surface energy, $\mu$ is viscosity, r is particle radius, and t is time. A more generally accepted sintering relationship that has been fit to experimental data is:

$$\frac{\Delta l}{l_0} = A_0 t^m e^{\frac{-mE_a}{RT}} \tag{2}$$

where $A_0$ is a constant, m is a rate parameter ($\sim{}^1\!/_3\text{--}{}^1\!/_2$), $E_a$ is the activation energy, R is the universal gas constant, and T is temperature. The rate parameter (m) correlates well with a power function and the natural logarithm and the two could be conflated in experimental data thus also possible is:

$$\frac{\Delta l}{l_0} = A_0 \ln t e^{\frac{-mE_a}{RT}} \tag{3}$$

Therefore, the densification of a glass is increased as a power function or logarithmic function of time and an exponential function of temperature.

The activation energy is important for sintering kinetics and can give insight into the temperatures over which sintering occurs. Although activation energy varies between compounds, most glassy ceramics have an activation energy between $$300\text{--}500 \frac{\text{kJ}}{\text{mol}}.$$

This is determined by fitting experimental densification data and temperature data to the Arrhenius equation.

A goal in the study of sintering is to be able to predict densification rates under different thermal histories. A master sintering curve based on the combined stage sintering model was developed that predicts sintering behavior regardless of heating profile and predicts activation energy that agree with experiment. This is an extremely useful ceramic processing tool when the final state of the material is the goal.

For thermal paints the inverse is needed i.e., a method by knowing the final state being able to recover the thermal history.

SUMMARY OF THE INVENTION

Proposed in this disclosure is a new thermal paint system comprising a library of glass-ceramic paints that undergo an optical transition that when captured by a UV:VIS spectrometer can recover temperature information. Further disclosed is a transient sintering energy model, that can recover information regarding the thermal history of a glass ceramic, functioning in a capacity beyond a thermal paint.

Also proposed is the idea that viscous flow sintering in glassy materials begins at the glass transition temperature ($T_g$) marking the beginning of the thermal paints transition range. This is supported by measures of the temperature dependence of the activation energy of the glass transition.

The present disclosure seeks to improve upon the shortcomings of traditional thermal paints by:

Fabricating high-resolution thermal paints, based on the sintering of glass ceramics, with strong adhesion to nickel-based superalloys.

Fabricating high-resolution thermal paints, based on the sintering of glass ceramics, with strong adhesion to SiC—SiC Ceramic Matrix Composite materials.

Developing an automated system that quantifies thermal paint transitions using UV:VIS spectroscopy and generates digital surface temperature maps.

Establishing a sintering model capable of recovering the full thermal history, not merely maximum temperature.

BRIEF DESCRIPTION OF THE DRAWINGS

These and other advantages of the present invention will become more readily apparent upon reading the following detailed description and upon reference to the drawings in which:

FIGS. 18A-18B show (a) Qualitative pixelation results, (b) corresponding temperature map of a superalloy coupon exposed to a temperature gradient with maximum temperature of 650° C. for 1 hour;

FIG. 19 illustrates pixelation results of an Inconel coupon subjected to a temperature gradient (FIGS. 18A-18B) showing that the GL-1705 paint is in range and the rest are out of range;

Figure 20:
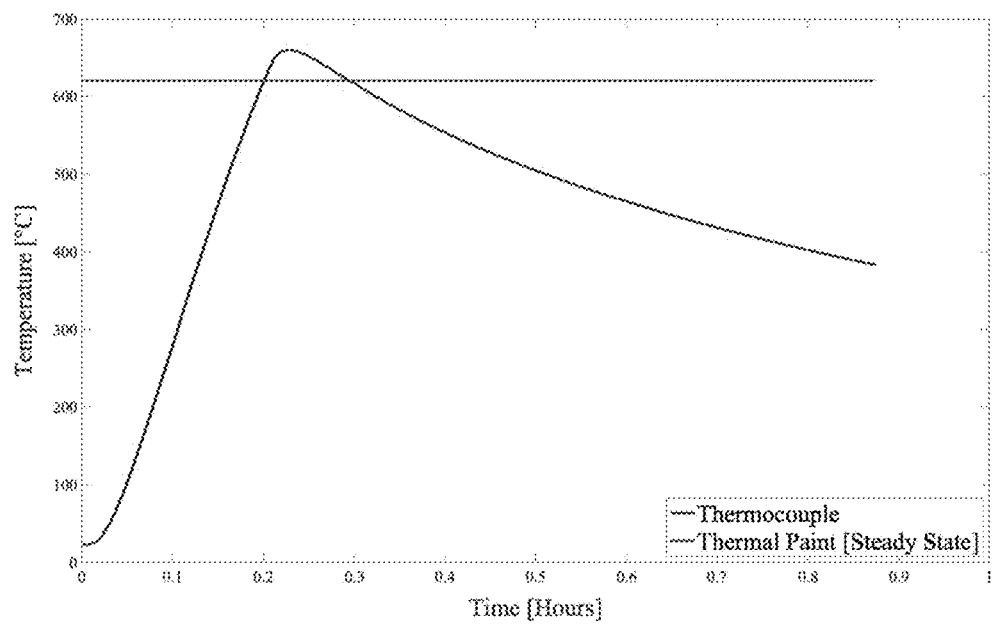
FIG. 20 illustrates GL-1705 thermal paint exposed to a transient temperature and compared to thermocouple data.
Figure 22:
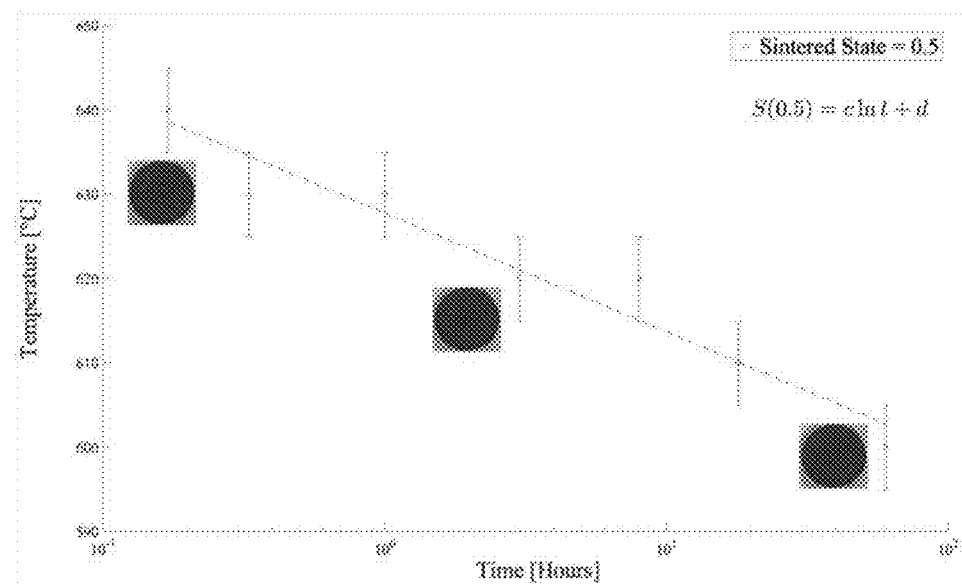
Figure 23:
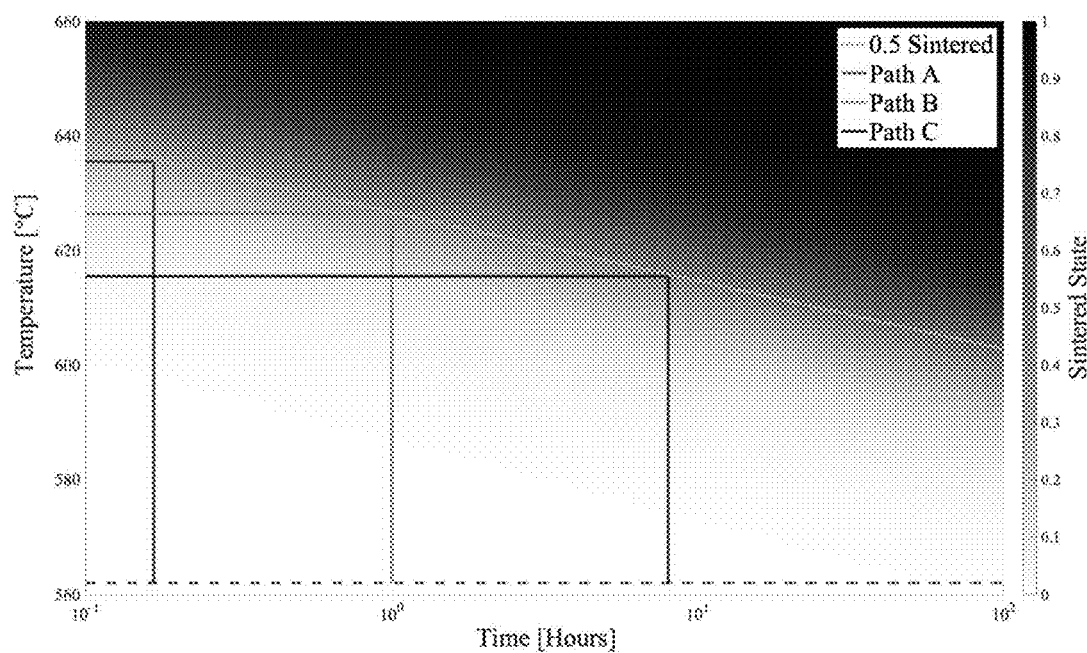
Figures 24, 25:
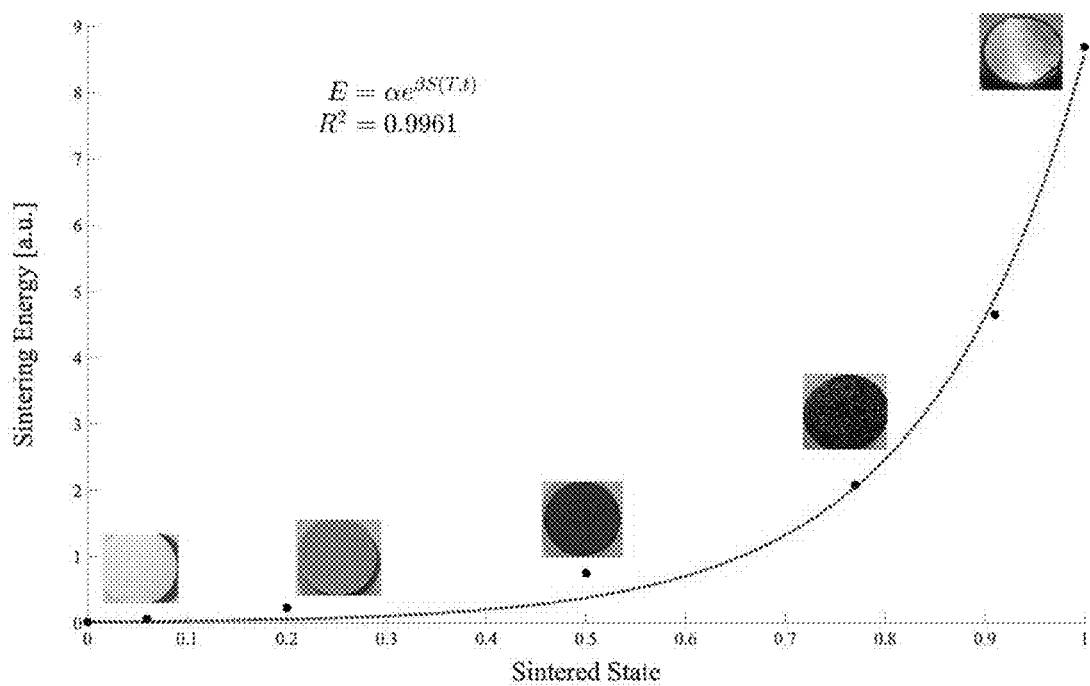
Figure 26:
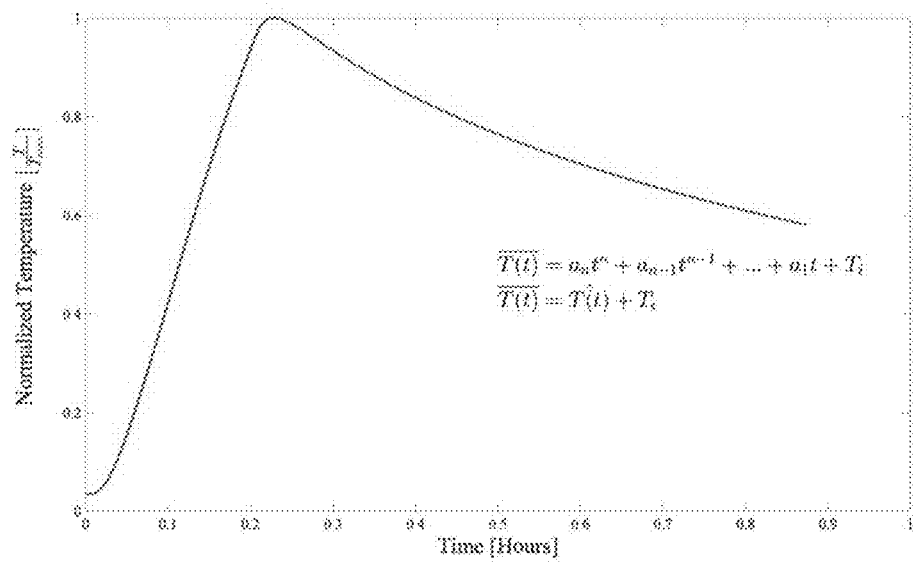
Figure 27:
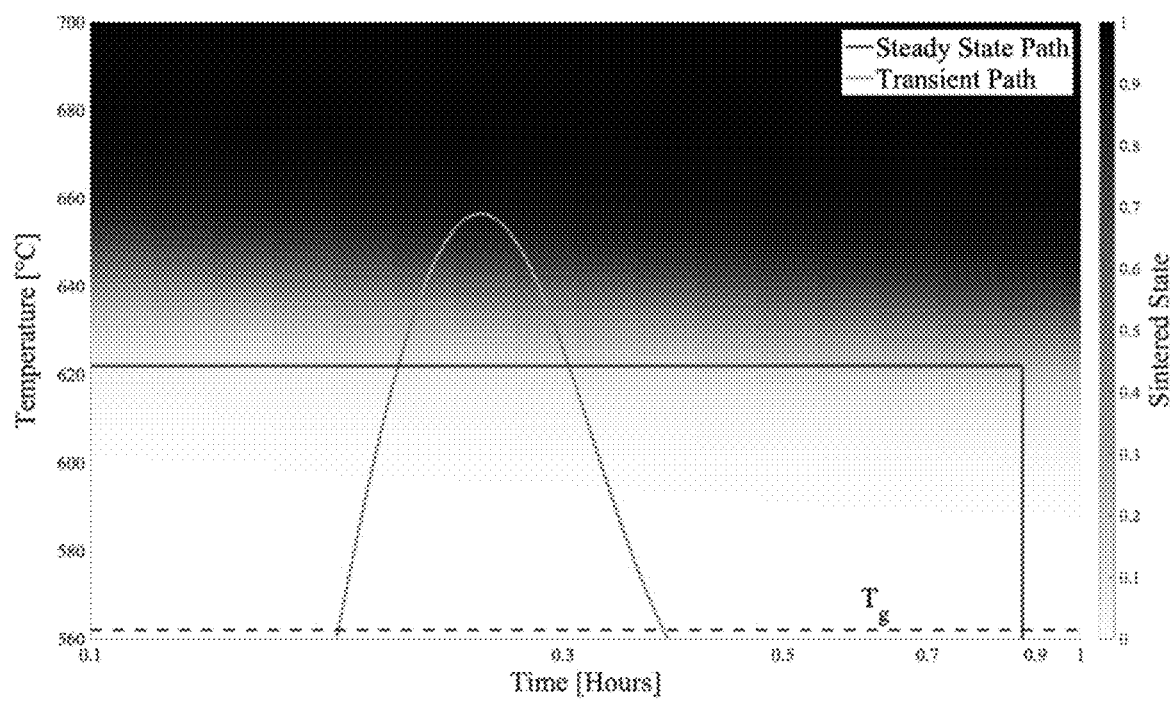
Figure 28:
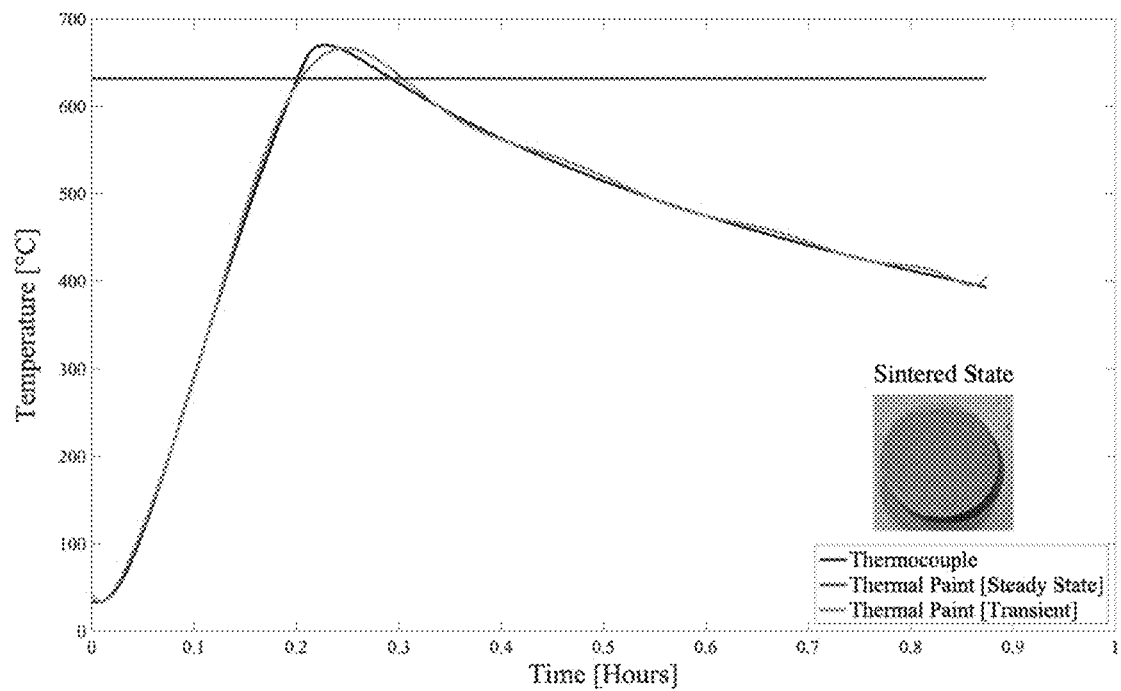
Figure 29:
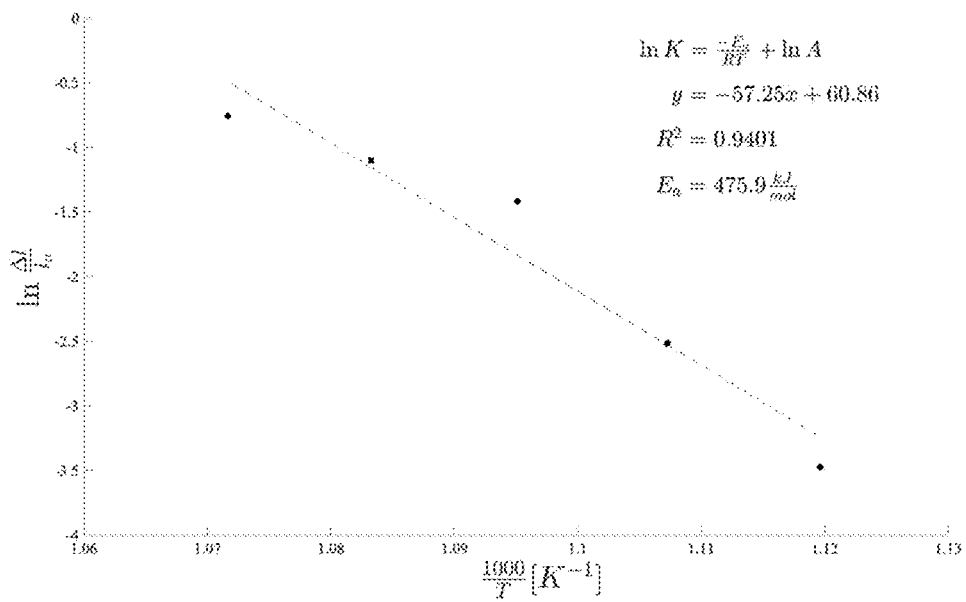
Figure 30A:
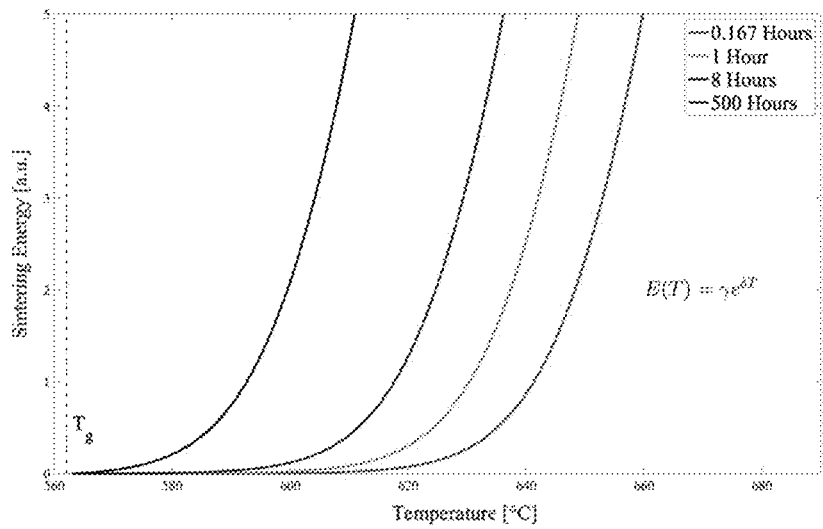
Figure 30B:
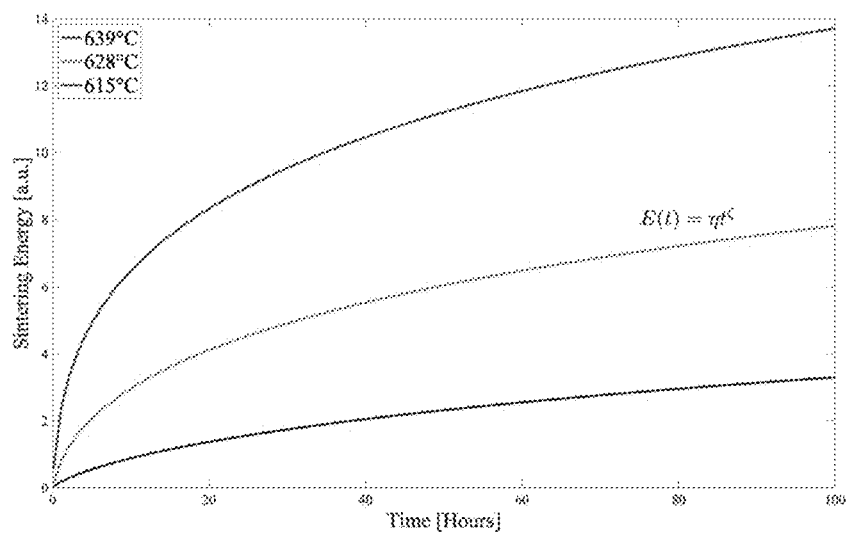
Figure 31:
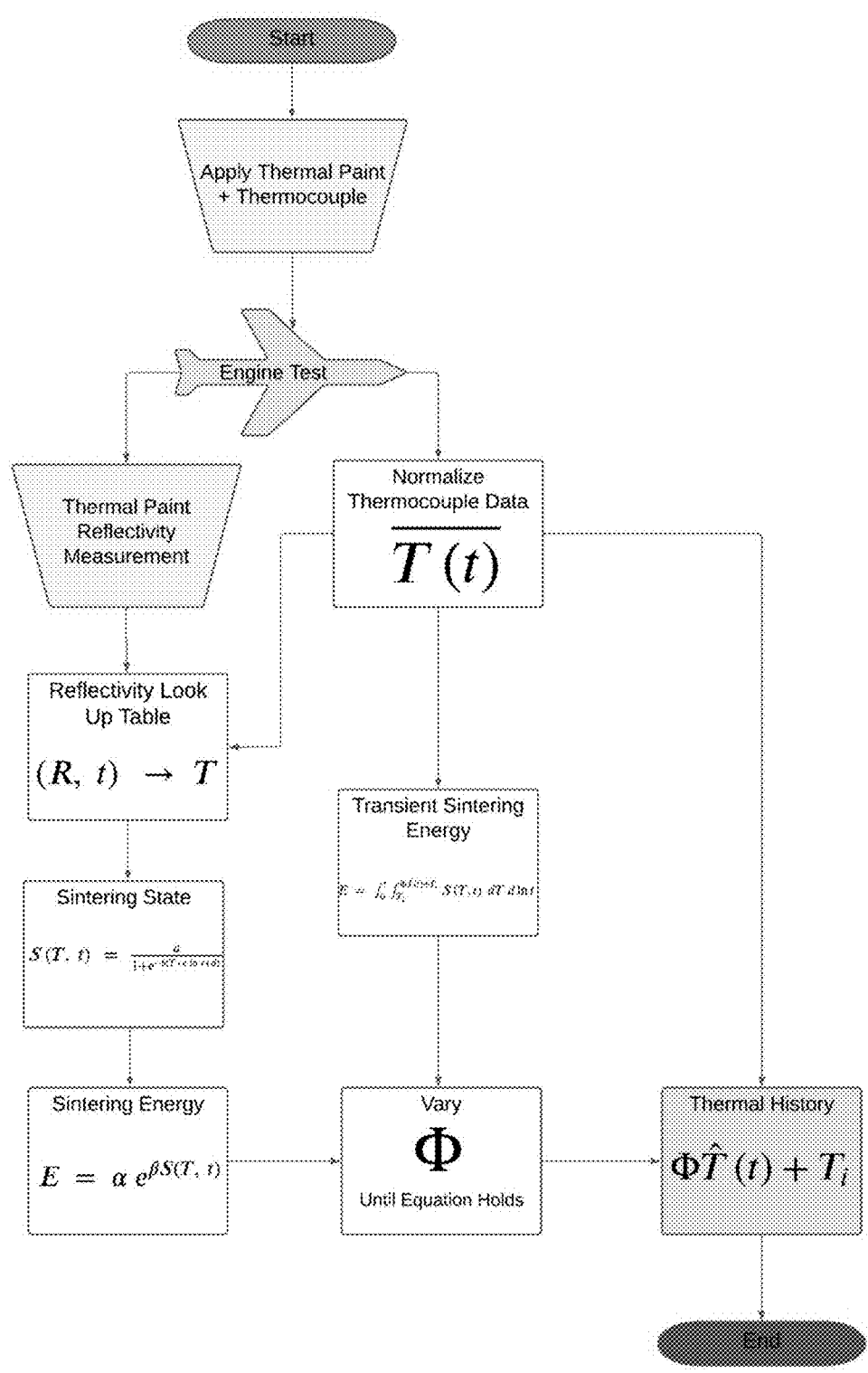
Figure 34A:
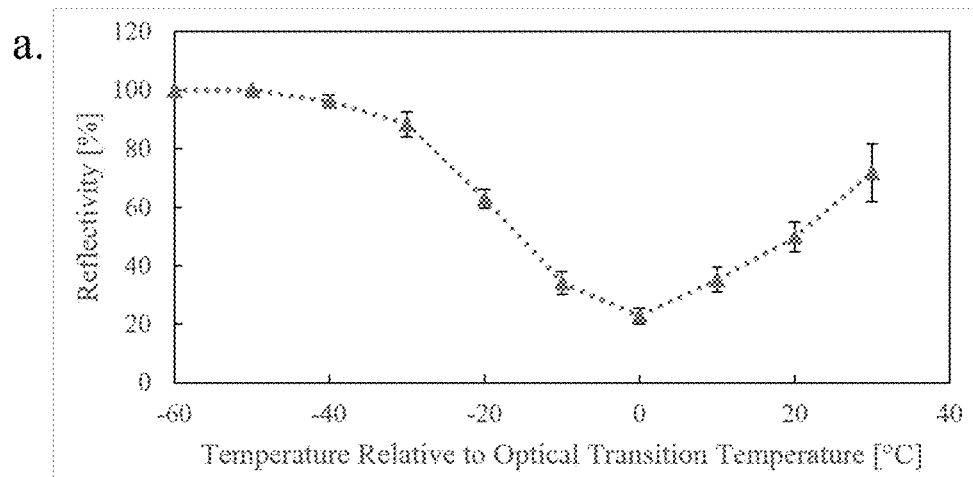
Figure 34B:
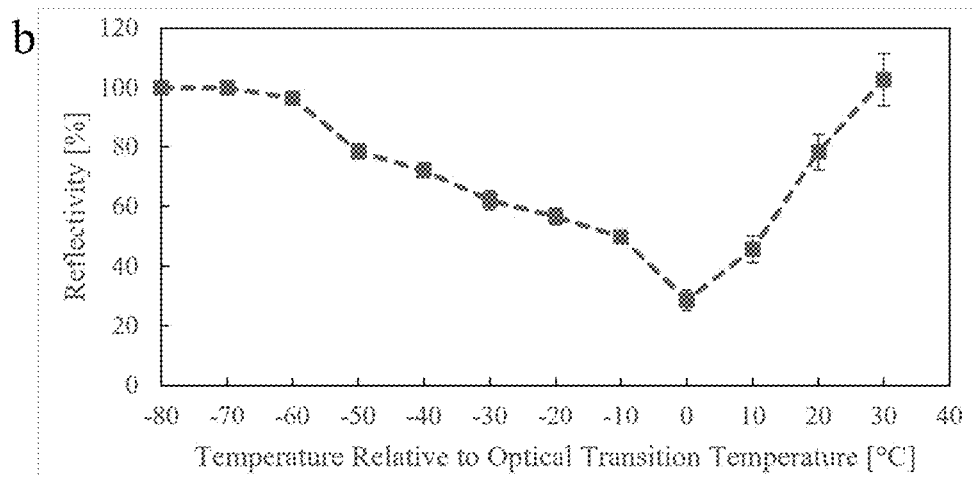
Figure 34C:
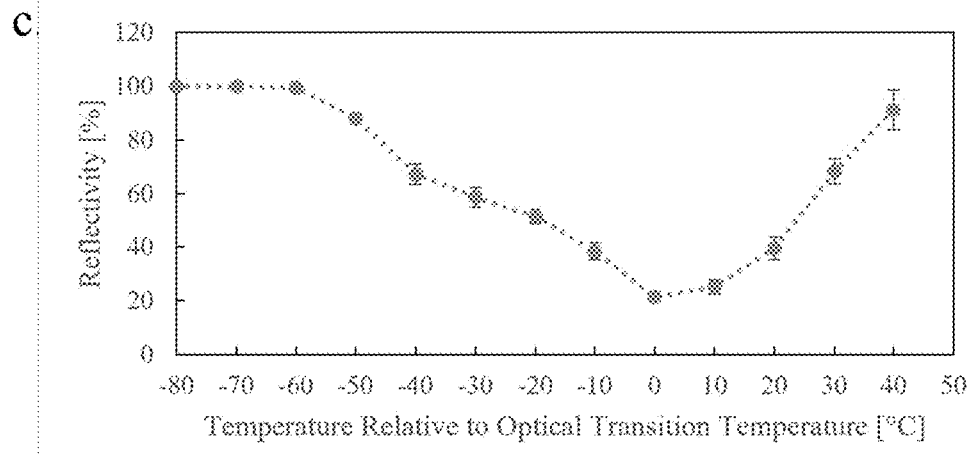
Figure 35:
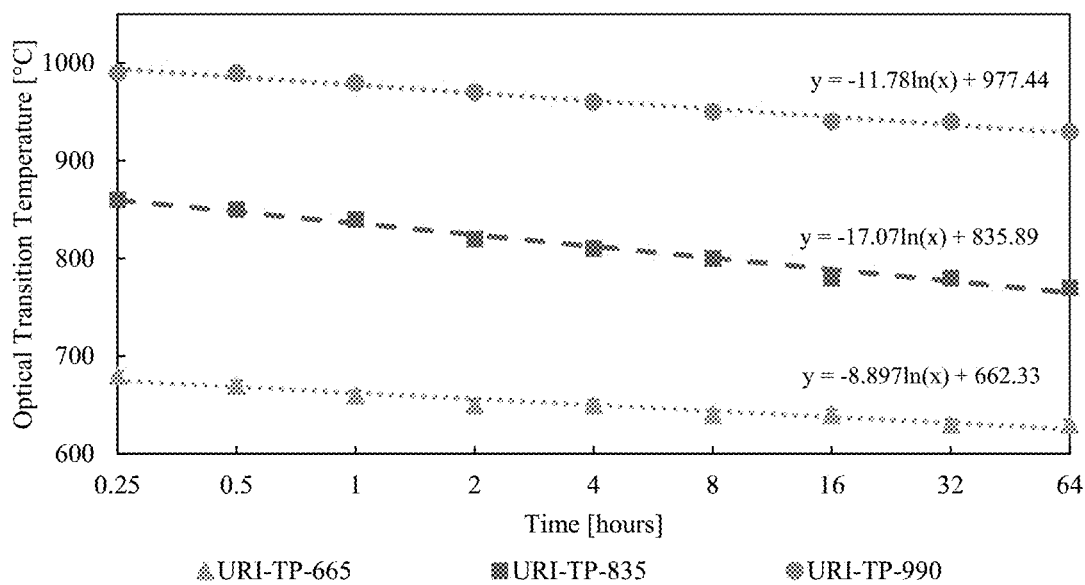
Figure 36:
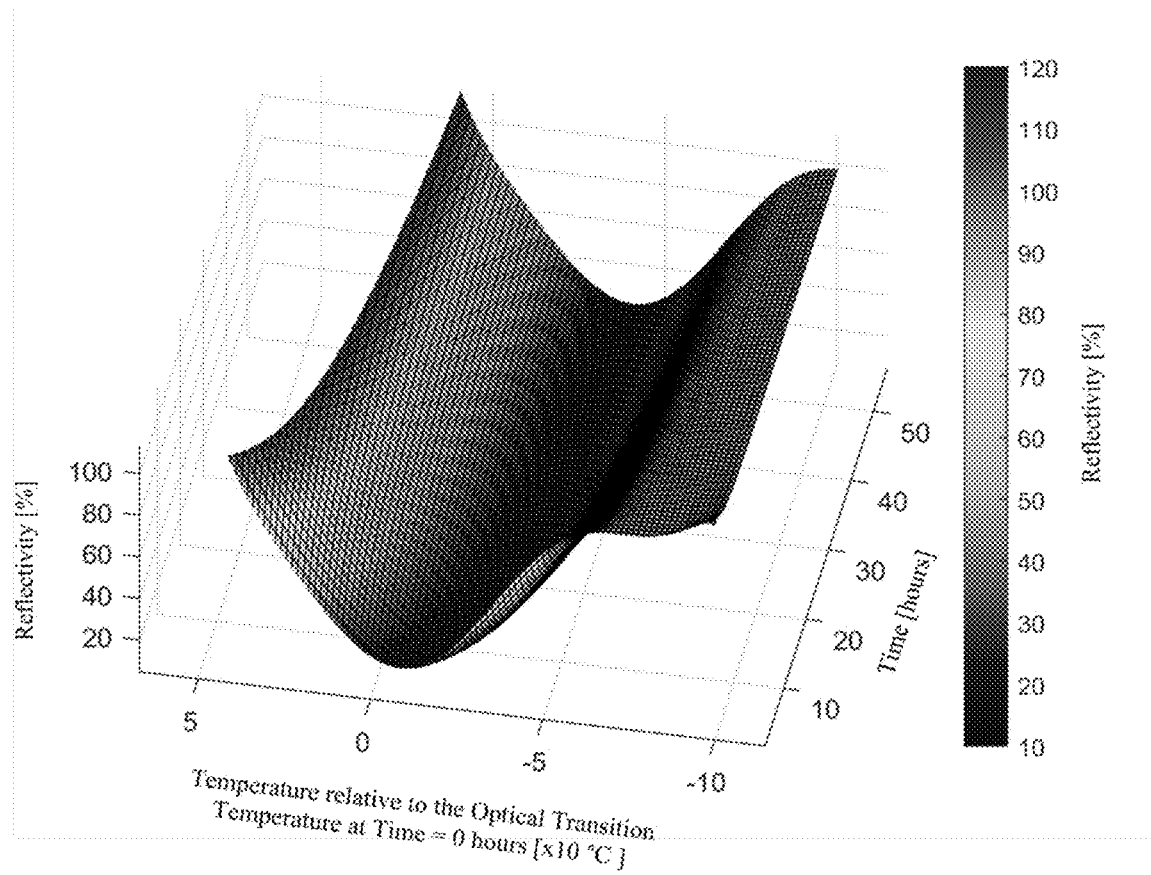
Figures 42, 43:
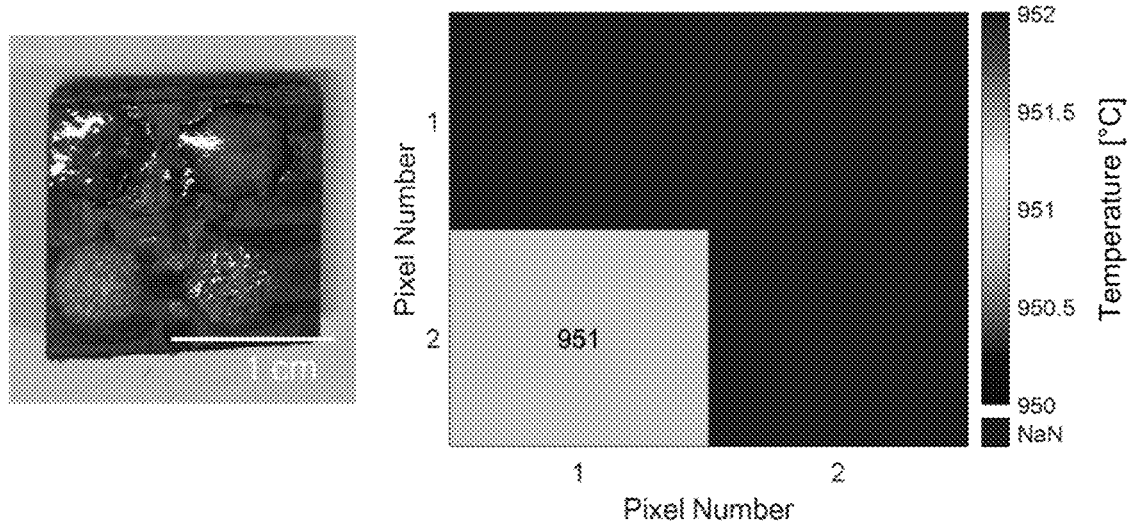

of GL-1705 as a function of temperature for 10 minutes of exposure with the corresponding optical properties;

FIG. 22 illustrates time-temperature behavior of the GL-1705 paint to achieve sintered state S(0.5) also known as the Optical Transition Temperature (To);

FIG. 23 illustrates time-temperature paths (A, B, C) graphed on the sintering surface reaching the sintered state (0.5) thus having equal optical properties;

FIG. 24 shows sintering energy calculated for various time-temperature paths (including those from FIG. 23) to achieve the sintered state S(0.5);

FIG. 25 shows sintering energy (E) as an exponential function of sintered state with corresponding optical properties;

FIG. 26 illustrates thermocouple data from FIG. 20 normalized and fit to a polynomial used as the transient temperature path;

FIG. 27 illustrates transient and steady state paths of equal sintering energy graphed on the sintering surface;

FIG. 28 shows thermal history of the GL-1705 thermal paint determined from the transient sintering energy model and compared to the steady state lookup table and thermocouple data;

FIG. 29 is an Arrhenius plot of log densification vs. inverse temperature to calculate the GL-1705 activation energy;

FIGS. 30A and 30B show sintering energy as function of (a) temperature for various times and (b) as function of time for various temperatures;

FIG. 31 is a flow chart of the transient sintering energy function to recover the full thermal history of a thermal paint;

FIGS. 32A-32C show optical transitions of SiC—SiC CMC thermal paints URI-TP-665 (a), URI-TP-835 (b), URI-TP-990 (c) after 30 minutes of exposure;

FIG. 33 charts optical transitions of thermal paints URI-TP-665 (a), URI-TP-835 (b), URI-TP-990 (c) after several exposure times;

FIGS. 34A-34C illustrate normalized reflectivity as a function of temperature relative to the optical transition temperature graphs for the three thermal paints developed: URI-TP-665 (a), URI-TP-835 (b), and URI-TP-990 (c);

FIG. 35 illustrates shift in the optical transition temperature of the thermal paints with respect to exposure time;

FIG. 36 shows a 3D Temperature-Time-Reflectivity surface for URI-TP-835;

FIG. 37 compares results of the validation experiments comparing the 3D Temperature-Time-Reflectivity surface results to those of a thermocouple;

FIGS. 38A-38C show post-tested coupons of single thermal paint pixelation experiments (left) together with a thermal map of the pixelated surface (right);

FIG. 39 charts pixelation test inputs (time and reflectivity) and outputs (3D Surface temperature) of single-thermal paint pixelation tests performed where reflectivity and temperature values output from the 3D surface are listed in order from top left to bottom right;

FIG. 40 is a diagram of spray patterns applied to CMC substrates used for multi-thermal paint pixelation experiments;

FIG. 41 illustrates post-tested coupon of URI-TP-665 on the top row and URI-TP-990 on the bottom row exposed to 900° C. for 9.0 hours (left) together with a thermal map of the pixelated surface (right);

FIG. 42 illustrates a post-tested coupon of URI-TP-665 on the top row, URI-TP-990 on the bottom left subpixel, and URI-TP-835 on the bottom right subpixel exposed to 950° C. for 2.0 hours (left) together with a thermal map of the pixelated surface (right); and FIG. 43 charts pixelation test inputs (time and reflectivity) and outputs (3D Surface Temperatures) of multi-thermal paint pixelation tests performed where reflectivity and temperature values output from the 3D surface are listed in order from top left to bottom right.

DETAILED DESCRIPTION OF EXEMPLARY EMBODIMENTS

Exemplary embodiments of thermal paint systems in accordance with the teachings herein will now be described hereinbelow for use with Nickel-based superalloys and SiC—SiC Ceramic Matrix Composites (CMC). The inventive concepts and methodologies described herein are equally applicable to both types of substrates as well as others. Glass powder base materials for the systems are chosen to match the Coefficient of Thermal Expansion of the underlying substrate being examined and for a particular glass transition temperature ($T_g$) to define an operating range.

Nickel-Based Superalloys

In the first exemplary embodiment, glass powders are selected to match the CTE of Nickel-based superalloys.

Fabricating Temperature Indicating Paints

The temperature indicating paints (thermal paints) consist of three components: glass powders, water, and METHOCEL™ (cellulose ether) (METHOCELL is a trademark of Dupont Chemical).

The glass powders used in the present paint system are commercially available sealing glasses from MO-SCI Corporation. The particular glass powders selected for the CTE and temperature ranges are as follows: MOSCI GL-1734 (Table 1-1), MOSCI GL-1705 (Table 1-2), MOSCI GL-1862 (Table 1-3) and the resulting properties were: glass transition temperature ($T_g$), coefficient of thermal expansion (CTE), and optical transition temperature ($T_o$).

Water and METHOCELL added to the glass powder increases viscosity and binds the paint for easier application. The constituents are mixed in the following ratio: 5 g glass powder: 3 mL METHOCELL (2 wt %): 1 mL water. The thermal paint is shaken vigorously and is ready for application via spraying.

TABLE 1-1

Composition and properties of MOSCI GL-1734 glass powder used in the GL-1734 thermal paint.

| Chemical Species | Composition (wt %) |
| --- | --- |
| $P_2O_5$ | 47.4 |
| $Sb_2O_3$ | 11.8 |
| BaO | 11.1 |
| ZnO | 10.6 |
| CaO | 7.1 |
| $K_2O$ | 4.3 |
| $Na_2O$ | 3.5 |
| $Li_2O$ | 1.9 |
| $Al_2O_3$ | 1.3 |
| $B_2O_3$ | 1.0 |
| Physical Properties | |
| Glass Transition Temperature ($T_g$) | 370 ± 10° C. |
| Softening Temperature ($T_s$) | 408 ± 10° C. |
| Coefficient of Thermal Expansion (CTE) | $14.5 \times 10^{-6\circ}$ C.$^{-1}$ |
| Mean Particle Size | 45 μm |

TABLE 1-2

Composition and properties of MOSCI GL-1705 glass powder used in the GL-1705 thermal paint.

| Chemical Species | Composition (wt %) |
| --- | --- |
| SrO | 59.2 |
| $Al_2O_3$ | 25.1 |
| $B_2O_3$ | 9.26 |
| NiO | 4.73 |
| BaO | 1.61 |
| CaO | 0.14 |
| Physical Properties | |
| Glass Transition Temperature ($T_g$) | 563 ± 10° C. |
| Softening Temperature ($T_s$) | 598 ± 10° C. |
| Coefficient of Thermal Expansion (CTE) | $8 \times 10^{-6\circ}$ C.$^{-1}$ |
| Mean Particle Size | 45 μm |

TABLE 1-3

Composition and properties of MOSCI GL-1862 glass powder used in the GL-1862 thermal paint.

| Chemical Species | Composition (wt %) |
| --- | --- |
| BaO | 47.0 |
| $SiO_2$ | 35.0 |
| CaO | 15.2 |
| $Al_2O_3$ | 2.8 |
| Physical Properties | |
| Glass Transition Temperature ($T_g$) | 725 ± 10° C. |
| Softening Temperature ($T_s$) | 762 ± 10° C. |
| Coefficient of Thermal Expansion (CTE) | $10.3 \times 10^{-6\circ}$ C.$^{-1}$ |
| Mean Particle Size | 45 μm |

Applying Temperature Indicating Paints

Figures 1A, 1B, 1C:
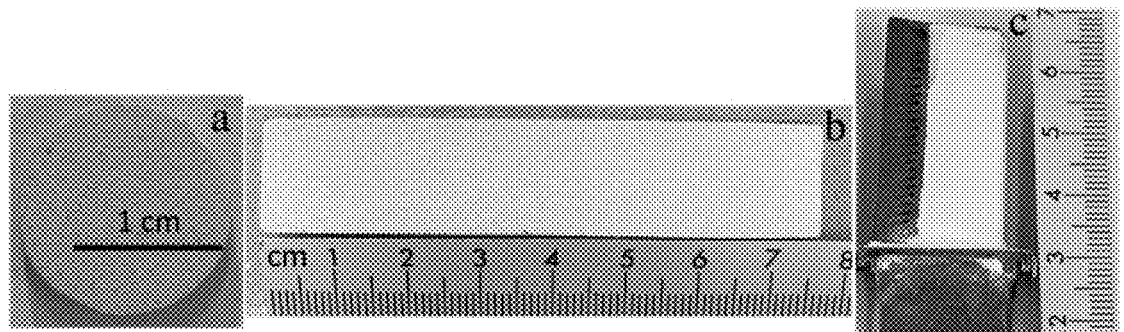
FIG. 1A-1C are photographs of (a) Inconel 718 coupon (b) large Inconel 718 coupon (c) Inconel 718 turbine blade all coated with a thermal paint ready for high temperature exposure.

Exemplary substrate coupons are illustrated in FIG. 1A (Inconel 718 round coupon), FIG. 1B (Inconel 718 rectangular coupon) and FIG. 1C (Inconel 718 turbine blade).

Prior to application, the coupon substrates are polished using silicon carbide paper, cleaned with isopropyl alcohol, and preheated to 70° C. on a hotplate. The thermal paint is loaded into a spray gun and applied to the surface until the substrate is no longer visible having thickness of ~45 μm.

The painted coupons were placed into a Thermo Fisher Scientific FB1415M box furnace at ambient temperature and ramped to 300° C. at $$\frac{5\,°C.}{min}$$

for the binder burnout.

Figure 2:
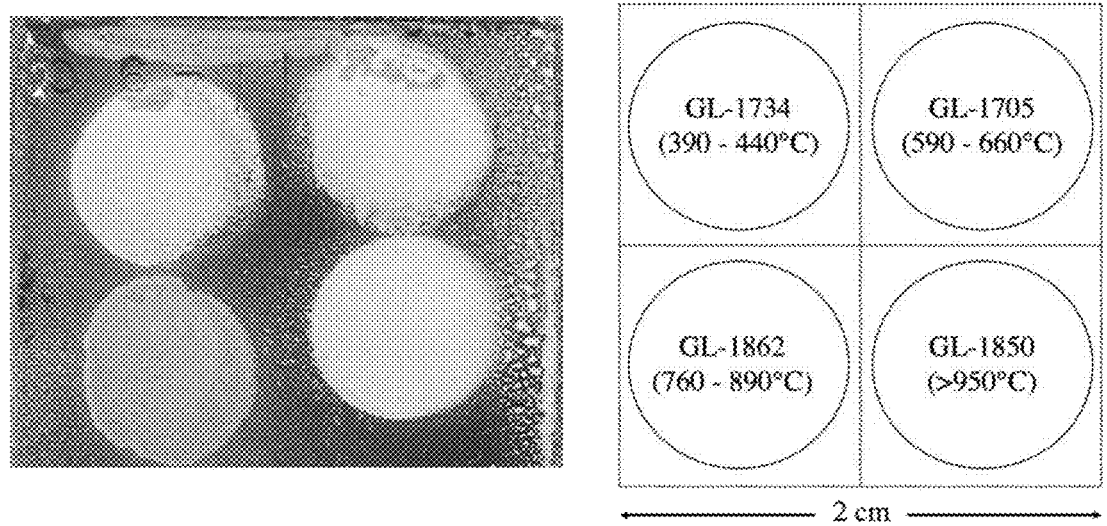
FIG. 2 is a photograph of a (a) Inconel 718 substrate pixelated with multiple thermal paints and (b) diagram of position and temperature range.

To capture the temperature ranges and temperature gradients inside an engine, multiple thermal paints must be placed in close proximity or pixelated as shown in FIG. 2. A paint based on MOSCI GL-1850, was used solely in this experiment as an upper limit for temperature indication. A stencil placed over the substrate enabled the application of different paints near each other without interference.

High Temperature Testing

Figure 3:
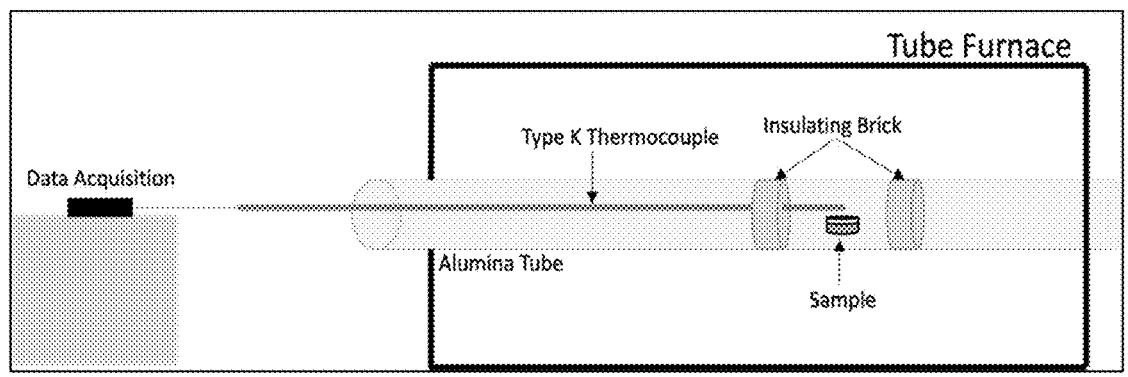
FIG. 3 is a diagram of the experimental furnace apparatus for testing thermal paints.

For the thermal paints to function as wireless temperature sensors the optical transition had to be calibrated. A diagram of the experimental apparatus used for high temperature exposure is illustrated in FIG. 3.

The hot zone was isolated from the rest of the furnace using insulating brick and temperature was recorded using a Type K thermocouple. The thermal paint coated superalloy coupons were inserted into the hot zone and exposed to a temperature between 350-950° C. for 10 min to 60 hours. The superalloy coupons were then removed and cooled to room temperature.

Visual Inspection

After exposure to high temperature, the transition 'state' of the thermal paints was observed by visual inspection allowing for instantaneous temperature information without the need of instrumentation. Each 'state' was indicative of temperature, thus, the thermal paint functions as a passive wireless temperature sensor.

UV-VIS Spectroscopy

Figure 4:
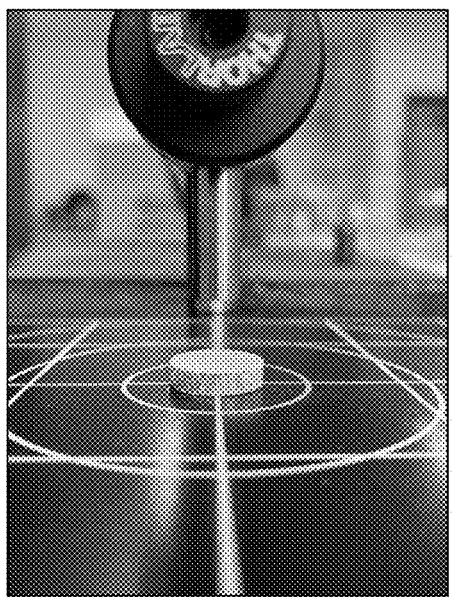
FIG. 4 is a photograph of a UV: VIS spectrometer reflection probe placed over a thermal paint calibration coupon for baseline measurement.

An Ocean Optics STS-VIS-L-50-400 SMA Microspectrometer [Ocean Insight 2020] with a QR400-7-VIS-NIR reflection probe and a HL-2000-HP halogen light source was used to quantitatively measure the transition 'state' of the thermal paint. The spectrometer was placed 1 cm above and normal to the painted surface and the reflectance spectra of the coupon at ambient temperature was used as the baseline as shown in FIG. 4. The measurement was repeated for coupons exposed to high temperature and the spectra was saved to a data library.

Scanning Electron & Optical Microscopy

Figure 5:
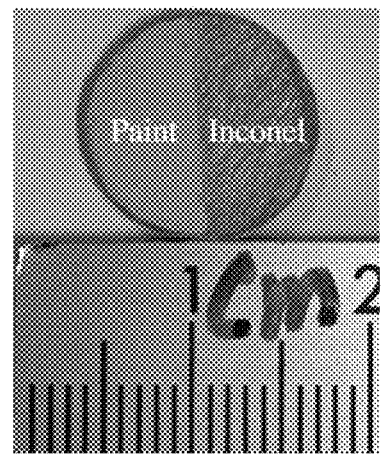
FIG. 5 is a photograph of a calibration coupon coated with a thermal paint in preparation for thickness measurement.

SEM was used to observe the microstructure of the thermal paint at various stages of transition and was correlated with the observed optical properties. An optical microscope was used to quantify thermal paint densification at the different stages of sintering. To achieve thickness measurements, a thermal paint was applied to half of the substrate shown in FIG. 5.

The boundary between the paint and substrate was observed under the microscope and focused on the top surface of the paint. The working distance was varied until the substrate came into focus and the difference on the fine focus wheel was a measurement of the paint. This method of determining thickness had micrometer resolution. This measurement was conducted before and after high temperature exposure to obtain density information.

Automation

Figure 6:
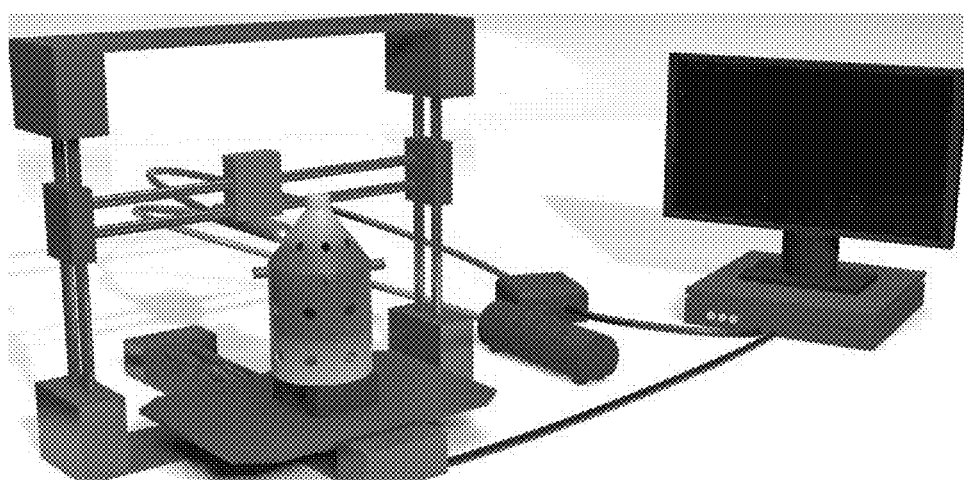
FIG. 6 is an illustration of a UV: VIS spectrometer incorporated into a gantry to measure the reflectivity of a combustor sprayed with a thermal paint.

Rastering the spectrometer over a superalloy coupon with a thermal paint enabled automation of spectral measurements with increased spatial resolution, decreased operator error, and streamlined the process. This produced digital temperature maps of the component surfaces which could be used for seamless comparison between experimental data and theoretical mapping. An illustration of the final system comprising a spectrometer, gantry system, computer, and combustor liner coated with a thermal paint is shown in FIG. 6.

Figure 7:
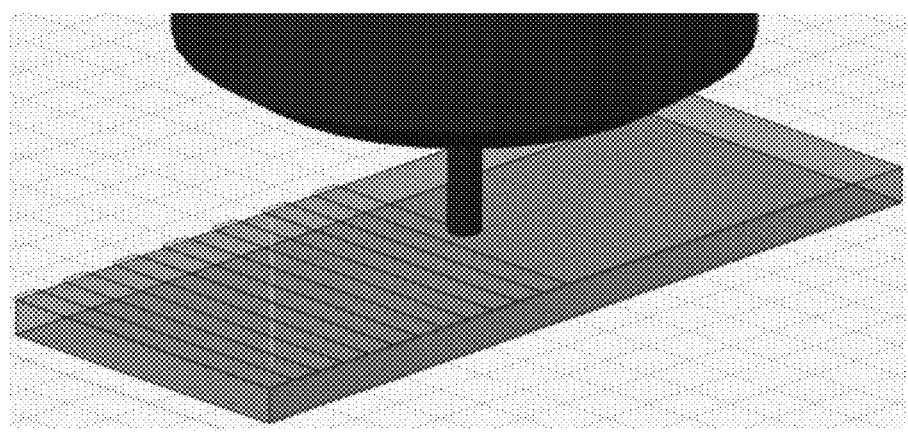
FIG. 7 illustrates a spectrometer trace generated in CAM (Fusion 360) on a coupon designed in CAD (AutoCAD) to be used by the gantry system.
Figure 8:
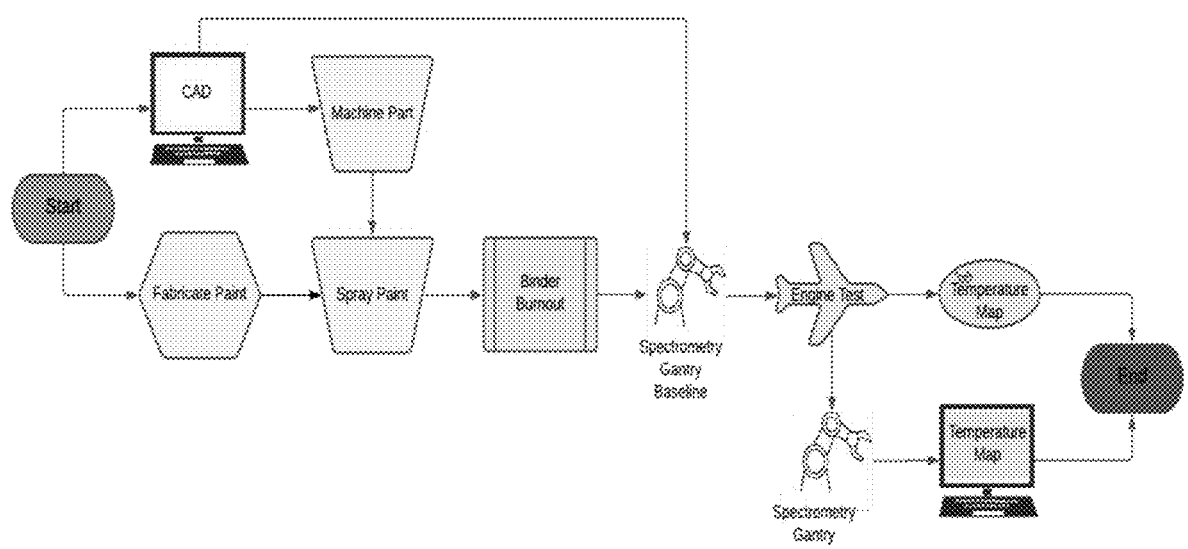
FIG. 8 is a flow chart of the automated temperature indicating paint system to produce qualitative and quantitative temperature maps of engine components.

Light traces in the gantry were necessary since the locations and angles of the spectrometer were kept constant during the baseline and post-high temperature measurements. These traces were generated using computer aided manufacturing (CAM) and computer aided design (CAD). An example of a spectrometer trace made using CAM software over the surface of a component is shown in FIG. 7. A flowchart of the automated thermal paint system used to produce qualitative and quantitative temperature maps is shown FIG. 8 for completeness.

Figure 9:
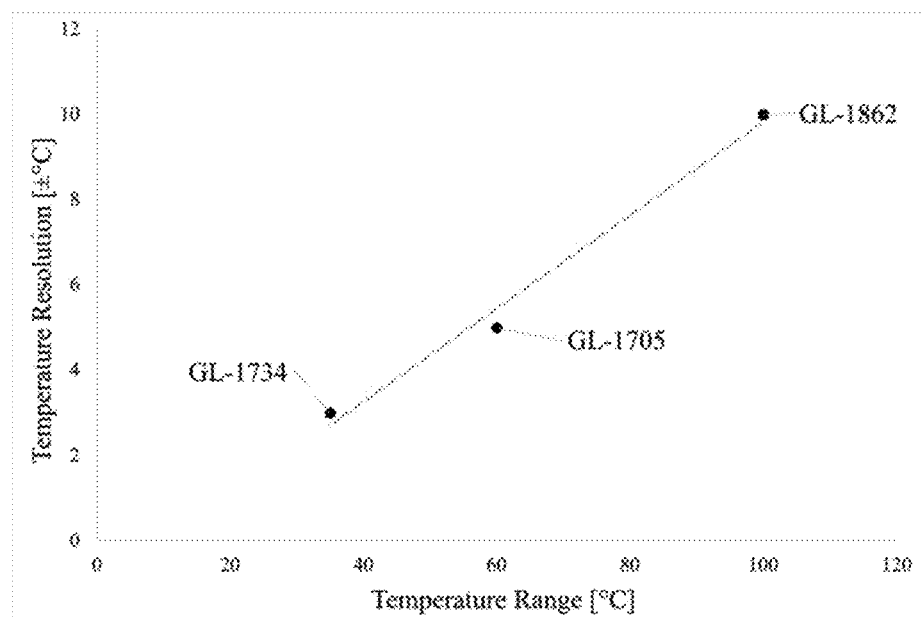
FIG. 9 illustrates temperature resolution vs. range of the thermal paints showing the inherent tradeoff due to the limits of the optical transition FIG. 10 are photographs of (a) GL-1734, (b) GL-1705, & (c) GL-1862 paints showing transitions when exposed to 10 minutes at temperature.

Glasses undergo viscous flow sintering, starting at the glass transition temperature ($T_g$), and produces in microstructural changes in the coating that give rise to an optical transition. These glasses can be fabricated into thermal paints for temperature indication, provided they adhere to the substrate during exposure. The thermal paints offer exceptional adhesion to the nickel-based superalloys due to their excellent match in coefficient of thermal expansion (CTE). However, paint adhesion can be poor when components are quenched, which is not likely in a real engine test. The paints indicate temperature with high resolution both qualitatively and quantitatively but have some limitations. There is an inherent tradeoff between temperature range and resolution due to the limits of the optical transition (See FIG. 9).

Qualitative Transition

Figure 10:
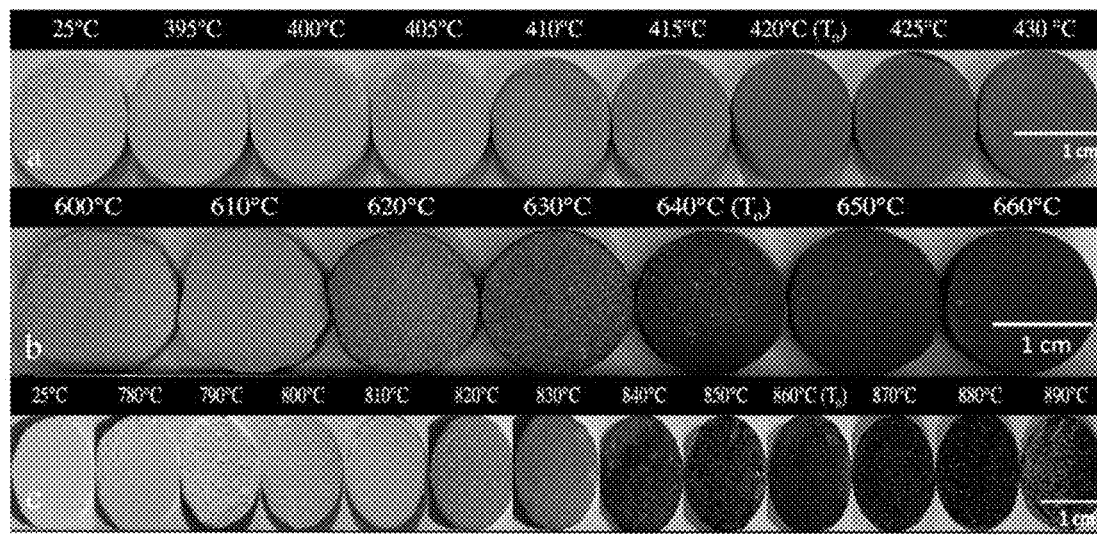

The thermal paints show an obvious and distinct transition in color, opacity, and texture when exposed to temperatures as shown in FIG. 10.

At ambient temperature, the paints appear as a granular, opaque white powder. As temperature increases the paints darken then transition to a smooth glassy film. The temperature at which the transition goes from opaque to glassy occurs was defined as the Optical Transition Temperature (To). Each paint has a distinct Optical Transition Temperature (To) and transition temperature range determined by its glass transition temperature (Tg).

SEM was used to confirm the sintering mechanism and relate the coating microstructure to the observed optical properties. The SEM micrographs in FIGS. 11A-11C capture the transition in surface morphology relationship and give insight into the optical properties.

Figures 11A, 11B, 11C:
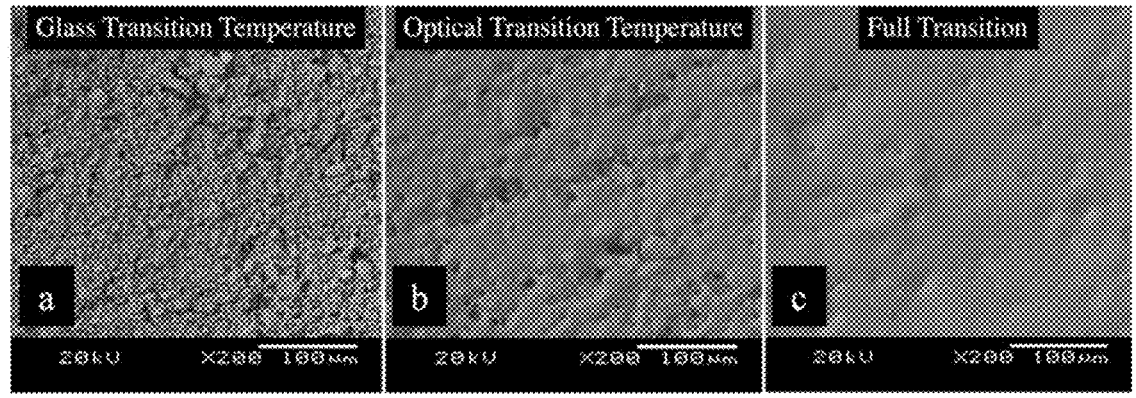
FIGS. 11A-11C are SEM micrographs of a thermal paint at (a) the glass transition temperature ($T_g$), (b) the Optical Transition Temperature (To), and (c) 30° C. above the Optical Transition Temperature (To), showing surface changes due to sintering.

At the glass transition temperature (Tg) the microstructure consists of discrete particles that scatter light diffusely causing the opaque white appearance (FIG. 11A). At the Optical Transition Temperature (To) the grains coalesce into a glassy network trapping light in the pores causing the paint to appear black (FIG. 11B). At temperature beyond the Optical Transition Temperature the remaining pores are eliminated forming a dense glass film where light can penetrate to the superalloy substrate causing specular reflection (FIG. 11C).

Quantitative Transition

The nature of the transition in the thermal paints is simply a transition in the visible light reflected off the surface. Thus, quantifying this optical transition with a UV:VIS spectrometer was an obvious next step. The spectral interpretation of the GL-1734 thermal paint transition shown in the upper strip of FIG. 10 is presented in FIG. 12.

The coated coupon at room temperature is defined as 100% reflective and is used as the baseline measurement. From ambient temperature to 400° C., there is no change in optical properties of the paint. From 400-420° C. light is reflected (diffuse reflectance), however, there is a drop in reflectivity due to the transition from white→grey→black. Immediately after the Optical Transition Temperature (420° C.) there is a sharp rise in reflectivity and variability in wavelength because of the glass films specular reflection indicating a total transition has occurred. At higher temperatures the optical properties are no longer discernible thus, the thermal paint is out of range. The UV:VIS spectra of the optical transition is consistent for all the thermal paints investigated. This suggests the sintering mechanism is similar in all the paints but occurs at different temperatures.

For the thermal paints to function as quantitative temperature sensors, a correlation between the quantitative optical properties and temperature must be made. A minimum in reflectivity of the thermal paint in the visible spectrum (R*) is plotted as a function of temperature (FIG. 13) for each paint formulation.

The optical transition was quantified using reflectivity data (FIG. 13) and fit to polynomials of the form:

$$R^*(T) = A_n T^n + A_{n-1} T^{n-1} + \ldots A_0 \quad (4)$$

where R* is the minimum reflectivity in the visible spectrum, T is temperature, and A and n are parameters that fit the reflectivity data.

Figure 12:
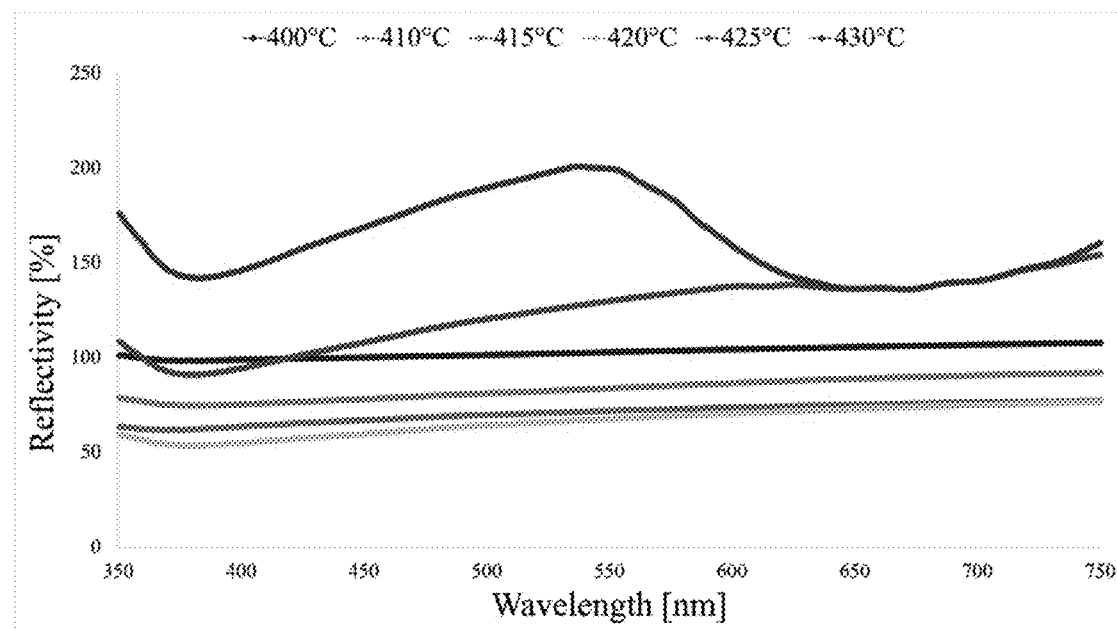
FIG. 12 illustrates the UV: VIS spectra of thermal paint (GL-1734) optical transition seen in FIG. 10.
Figure 13:
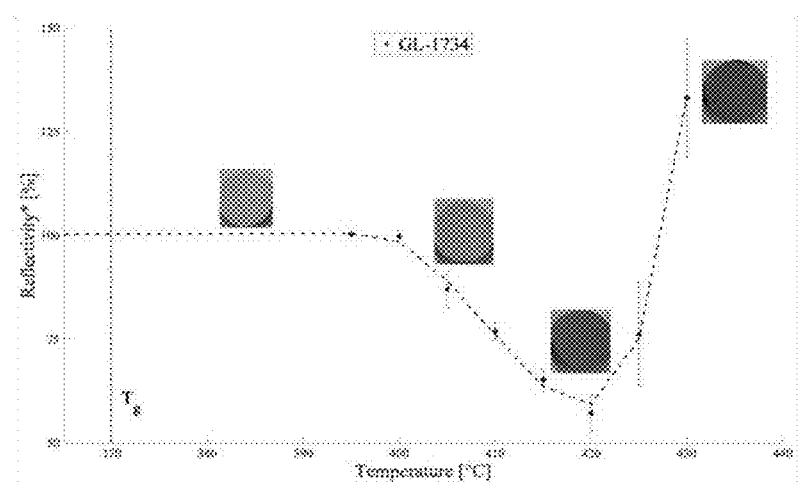
FIG. 13 graphs minimum reflectivity vs. temperature and the corresponding qualitative optical properties for (a) GL-1734, (b) GL-1705, (c) GL-1862. Exposure time=10 minutes.
Figure 13:
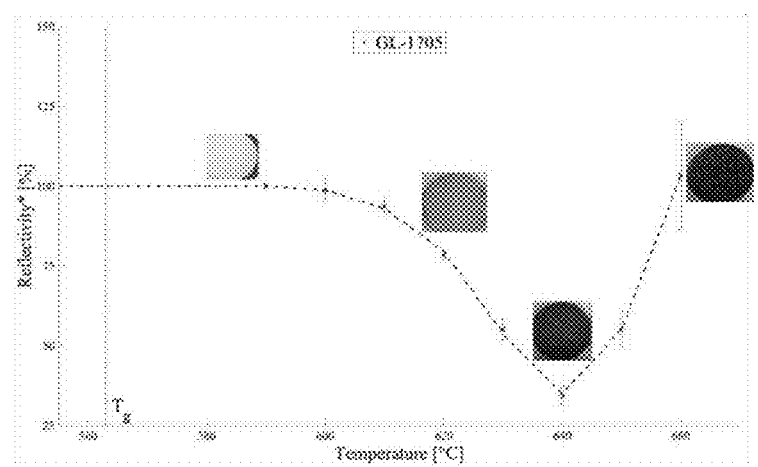
Figure 13:
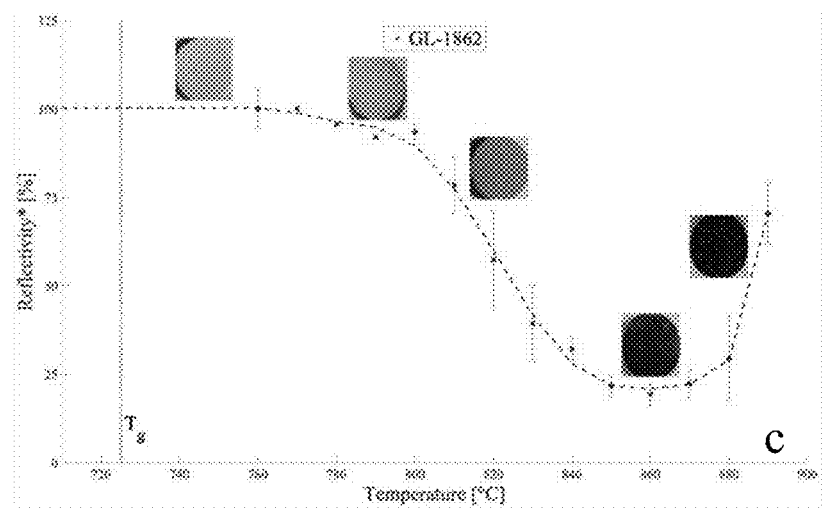

The results shown in FIG. 13 correspond to the qualitative transition shown in (FIGS. 10 and 11A-11C) and the spectral data in (FIG. 12). From room temperature to the glass transition temperature (Tg) the paint appears white, opaque, and is defined as 100% reflective. After reaching Tg, sintering and the optical transition is initiated. The paint darkens reaching minimum reflectivity at the Optical Transition Temperature (To). At higher temperature a glass film develops causing reflectivity to increase again.

Due to the nature of the temperature-reflectivity graphs, an input reflectivity can output a pair of temperatures. The real temperature can be deduced either qualitatively or quantitatively by asking the following questions: Is the paint opaque, glassy/transparent? Is there a plateau in reflectivity between 650-750 nm? The answer to either question will determine if the real temperature is the lesser or greater of the two possible temperatures.

UV:VIS spectroscopy is a simple, nondestructive, measurement that quantifies the optical transition in the thermal paints and can indicate temperature with accuracy and precision far above visual observation. However, qualitative observations with the naked eye are a fast and easy method to increase confidence in the results.

Time Effects

Figure 14:
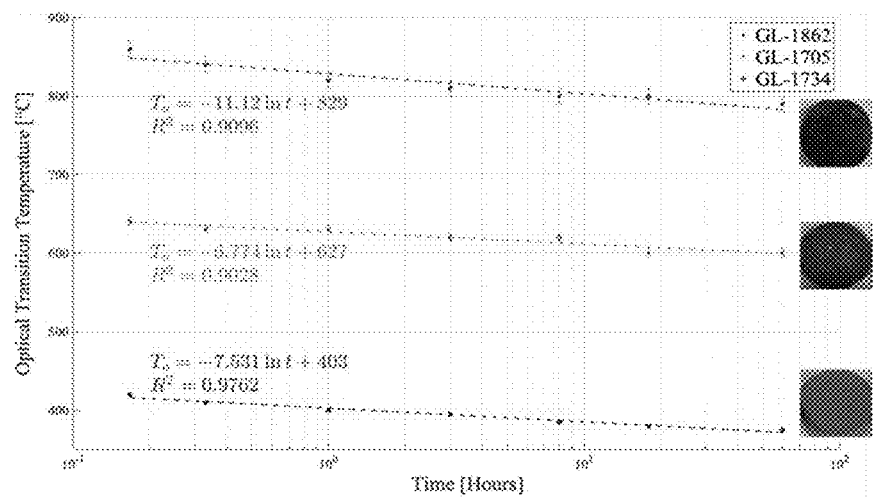
FIG. 14 illustrates Optical Transition Temperature as a function of time for the GL-1734, GL1705, GL1862 thermal paints. (Note logarithmic time dependence)

The sintering of the glass powders comprising the thermal paints is a function of time at temperature. For the thermal paints to function for long periods of time, this phenomenon must be well understood. The Optical Transition Temperature (To) of the thermal paints as a function of log-time is shown in FIG. 14. The results are consistent with known viscous flow sintering models.

The Optical Transition Temperature (To), and the transition range, decay as a logarithm of time and was verified experimentally up to 60 hours. This led to the following issue: a thermal paint exposed to two different temperatures and times could have the same optical properties. Therefore, to accurately disseminate temperature, information regarding the time of exposure is critical to the implementation of the thermal paints.

Figure 15A:
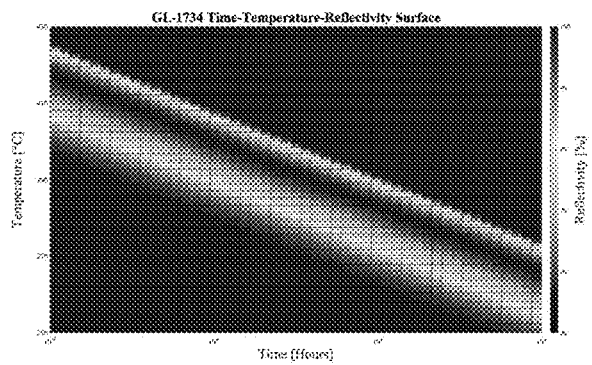
FIGS. 15A-15C illustrate Time-Temperature-Reflectivity surfaces of (a) GL-1734, (b) GL-1705, and (c) GL-1862 used as temperature lookup tables.
Figure 15B:
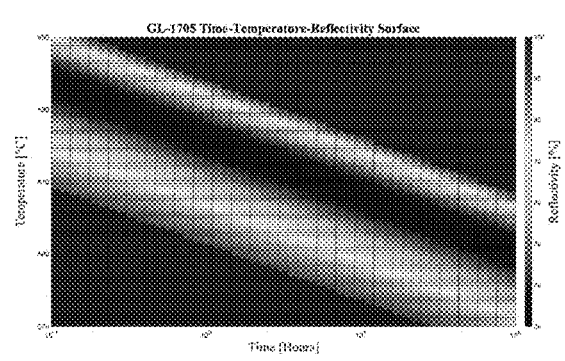
Figure 15C:
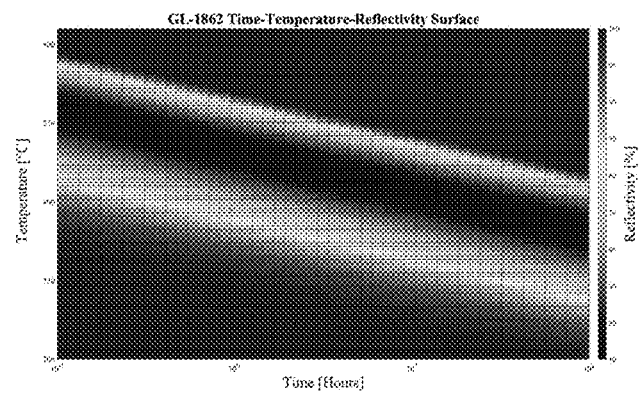

A model that incorporates both time and temperature is achieved by combining the reflectivity-temperature relationship (Eqn. 4) with the logarithmic transition temperature decays (FIG. 14) to produce the following mathematical model.

$$R^*(T,t) = A_n(T + B \ln t)^n + A_{n-1}(T + B \ln t)^{n-1} + \ldots A_0 \quad (5)$$

Where t is time in hours, and B is a constant. The results of the model, time-temperature-reflectivity surfaces are useful as lookup tables by inputting time of exposure and reflectivity data to recover maximum temperature and are shown in FIG. 15A-15C.

Application Testing (Steady State Maximum Temperature)

Figure 16:
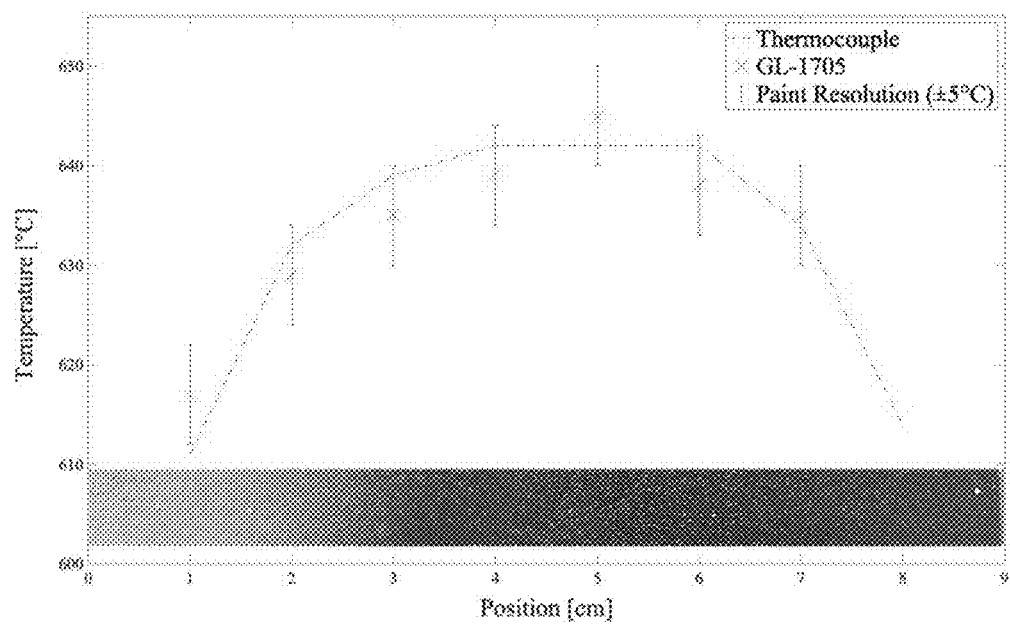
FIG. 16 graphically compares GL-1705 thermal paint and thermocouple on an Inconel coupon exposed to a temperature gradient for 1 hour.

For a thermal paint system to meet the demands of engine designers to verify engine designs it must accurately capture several temperature gradients. Shown in FIG. 16 are the qualitative and quantitative results of an Inconel 718 coupon sprayed with the GL-1705 thermal paint and subjected to a temperature gradient for one-hour. This was tracked using a Type K thermocouple for comparison.

The thermal paint shows an optical transition indicating maximum temperature in the center of the coupon. By employing a UV:VIS spectrometer and referring to the look-up table (FIG. 15B, Eqn. 5), quantitative temperature data was obtained that closely matches the qualitative transition. Comparison with the thermocouple data confirms the thermal paint system is very accurate.

Figure 17:
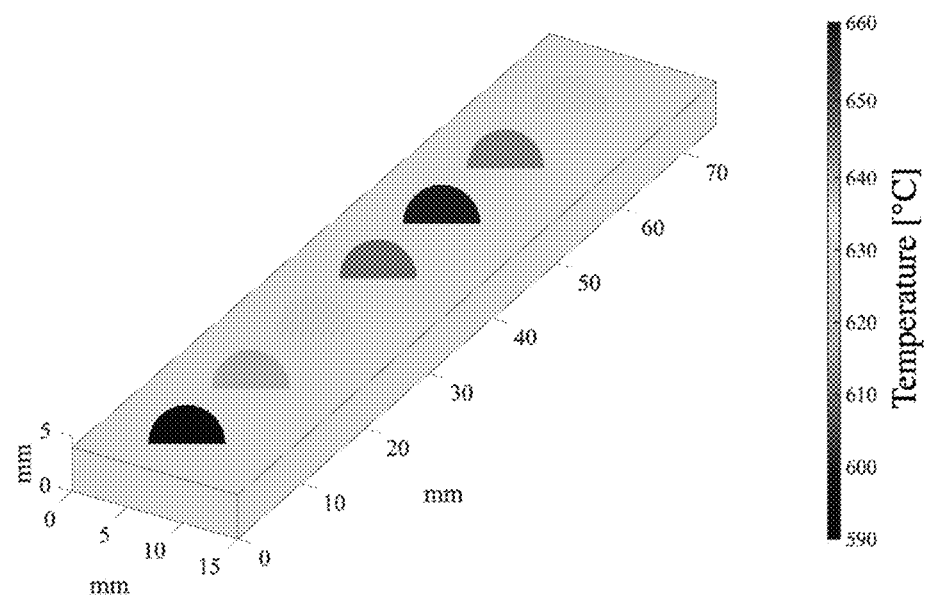
FIG. 17 illustrates a temperature map using data from FIG. 16 and overlayed on a 3D coupon for comparison purposes.

The benefit of quantitative temperature measurements is the ability to generate temperature maps superimposed on component surfaces. This enables the seamless comparison between simulation models and experimental data, highly sought after by engine designers. The results from FIG. 16 are overlayed on a 3D model of the superalloy coupon shown in FIG. 17.

The limitation of a using a single thermal paint in an engine application is ap-parent because the paint can only detect temperatures over a certain range, in this case between 590-660° C. As discussed above, by pixelating multiple thermal paints the temperature detection range can be increased dramatically while maintaining the resolution of a single thermal paint. FIGS. 18A-18B show the qualitative and quantitative results including a temperature map of a pixelated Inconel coupon in a temperature gradient.

Each paint in a pixel reveals temperature information, both qualitatively and quantitatively. For example, the middle pixel in FIG. 19 indicates by way of the right upper quadrant that the material reached a temperature of 635° C. The left upper quadrant exceeded the effective temperature range and the lower left and right quadrants were below the effective ranges.

Therefore, a pixel encompasses the cumulative temperature range of all the thermal paints while maintaining the resolution of individual paints and having built in redundancy. Efforts have been made to reduce pixel size and it has been found that individual paints can still distinguish temperature in an area as small as 0.25 cm2. Therefore, it is possible to create pixels able to detect temperature gradients upwards of $(250°\ C.)/cm^2$ by placing four paints inside 1 $cm^2$ while maintaining the resolution of an individual paint (±5° C.).

An obvious step when repeating spectroscopy measurements over a large area where high precision is necessary is to place the spectrometer in a gantry system and raster across the surface in an automated manner. A simple gantry system was built by using a CNC machine and replacing the mill with the spectrometer probe (See FIG. 6). The spectrometer light path is chosen in CAM software (FIG. 7) and the spectroscopy data is output to MATLAB to generate temperature maps.

In summary, the thermal paints developed here can indicate temperature qualitatively and quantitively using UV:VIS spectroscopy. Both methods agree with thermocouple data and can capture temperature gradients with high resolution. When pixilated, they can capture temperature gradients on the order of (250° C.)/cm². A simple automated spectrometer gantry system was built that assists in generating digital temperature maps that can be overlayed on component CAD files, for comparison purposes.

Measurement of Transient Temperatures

The above-described scenarios have only considered steady state temperature, conditions rarely seen in gas turbine engines. The limitations of this are made clear in the following experiment: a GL-1705 thermal paint sample and a thermocouple are exposed to transient temperature. The quantitative method of measuring temperature using thermal paint reflectivity was conducted and the results are shown in FIG. 20.

A thermocouple records the entire thermal history and shows a maximum in temperature at 660° C. The thermal paint indicates it was exposed to 621° C. for 0.9 hours. The discrepancy between the thermal paint temperature and the actual temperature will grow when exposed to more complicated temperature cycles. Therefore, a thermal paint model which incorporates transient temperature was needed and developed in the next sections.

Temperature Effects on Sintering State

Figure 21:
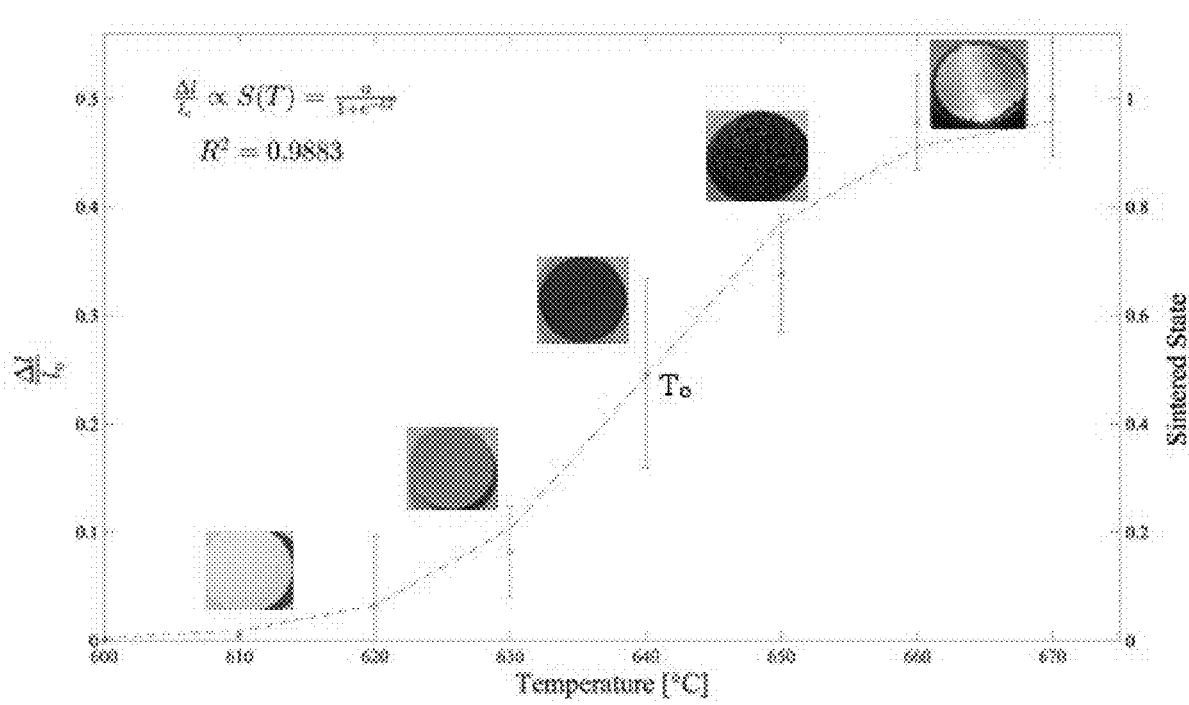
FIG. 21 illustrates sintered state (S) and $$\left(\frac{\Delta l}{l_0}\right)$$

Solid state sintering densification is measured by the change in thickness of the glass coating relative to its initial thickness $$\left(\frac{\Delta l}{l_0}\right)$$

and is commonly used to calculate Activation Energy when done at several different temperatures (see below). Here, the sintered state (S) is a normalized value that is used to quantify the extent of sintering or relative density and is typically derived from densification data. Densification $$\left(\frac{\Delta l}{l_0}\right)$$

and sintered state S as a function of temperature for the GL-1705 thermal paint is shown in FIG. 21.

The relationship between temperature and sintered state is represented as a sigmoidal function, having an exponential temperature dependence.

$$S(T) = \frac{a}{1 + e^{-bT}} \tag{6}$$

where S is the sintered state, T is temperature, and a and b are parameters to fit the experimental densification data. Below the transition range, sintering has yet to begin thus no changes in the sintering state or optical properties were observed. At temperature in the temperature range, sintering occurs rapidly giving rise to the optical transition. Above the transition range, sintering is complete and no additional changes in the sintered state or optical properties were observed.

Time Effect on Sintering State

Time effect on sintering was implemented into the sintering model using the fact the Optical Transition Temperature (To) occurs at a sintered state of approximately 0.5 and decays as the logarithm of time as shown in FIG. 22.

$$S(t) = c \ln t + d \tag{7}$$

where S is sintered state, t is time, and c and d are parameters to fit the data.

Combined Temperature & Time Effects on Sintering

After establishing the effects time and temperature independently, a complete model was developed that incorporates both variables, time and temperature, together.

$$S(T, t) = \frac{a}{1 + e^{-b(T + c \ln t + d)}} \tag{8}$$

This model has inputs of time and temperature after thermal paint exposure and outputs the sintered state. Many combinations of time and temperature can achieve the same sintered state as shown in FIG. 23.

Thermal paints following three temperature paths (A, B, C) that reach the sintered state S(0.5) are overlayed on the sintered state curve S(T,t). A method to equate these sintered states by comparing the areas under the time-temperature paths, coined heat work (° C.·s), was conducted and as obviously shown in FIG. 23 are unequal.

Sintering Energy Equation

A second method to equate these physical states is to calculate the volume under the sintered state curve that represents the sintering energy as defined in Equation (9).

$$E = \int_0^t \int_{T_g}^T S(T, t) dT \, d \ln t \tag{9}$$

where E represents the sintering energy in arbitrary units, Tg is glass transition temperature, and S(T, t) is the sintering curve defined in Equation 8.

The calculated results of the sintering energy for steady state time and temperature paths, including A,B,C from (FIG. 12), are listed in FIG. 24.

The paths chosen in FIG. 24 represent various steady state time-temperature paths producing a sintered state of 0.5 with equal sintering energy (0.7561±0.0013 a.u.). This indicates that the energy required to reach a sintered state can be the same for different paths.

Sintering energy is a function of sintered state and can be calculated by input-ting steady state time-temperature combinations of known sintered states into Equation 9, with the results shown in FIG. 25.

Each sintered state corresponds to a unique sintering energy and is expressed as exponential function of time and temperature.

$$E = \alpha e^{\beta s(T,t)} \tag{10}$$

where E represents the sintering energy, S(T, t) is the sintered state calculated using the steady state time and temperature, and α and β are constants. There exists an infinite number of time-temperature paths to reach a sintered state, but each state required the same amount of energy to reach. Simply, if the sintered states are equal, the sintering energy is equal, regardless of path taken. Therefore, sintering energy (E) can be viewed as a state function from a thermodynamic perspective.

$$S_1(T_1,t_1)=S_2(T_2,t_2) \rightarrow E_1=E_2 \quad (11)$$

This key idea is used to solve the problem of transient temperature. More information regarding Sintering Energy is discussed below.

Transient Sintering Energy Equation

Temperature path data is obtained by placing a thermocouple adjacent to the thermal painted coupon and normalizing the results to give no information regarding actual temperature. The thermocouple data from FIG. 20 is normalized, fit to a function, and used as the transient temperature path according to Equation 12 and is shown in FIG. 26.

$$\bar{T}(t) = \hat{T}(t) + T_i \quad (12)$$

Where $\bar{T}(t)$ is the normalized temperature path, $\hat{T}(t)$ is the shape of the path, and $T_i$ is the initial temperature.

In FIGS. 20 and 26, the thermal paint follows a transient path but appears to have taken the steady state path 621° C. for 0.9 hours using the spectral data and lookup table. These values are used to calculate the steady state sintered state ($S_{\hat{T}=0}$) and steady state sintering energy ($E_{\hat{T}=0}$).

$$S_{\hat{T}=0}(T, t) = \frac{a}{1 + e^{-b(T+c \ln t + d)}} \quad (13)$$

$$E_{\hat{T}=0} = \alpha e^{\beta S(T,t)} \quad (14)$$

With these two paths having equal sintered states, we can equate the sintering energies between the steady state and transient paths from the relationship established in Equation 11 giving rise to:

$$S_{\hat{T}=0} = S_{T(t)} \rightarrow E_{\hat{T}=0} = E_{T(t)} \quad (15)$$

The sintering energy equation (Eqn. 9) can be modified to account for transient paths by using the normalized temperature path function as the upper bound in the temperature integral and using the Φ[° C.] scaling parameter to unnormalize the temperature function.

$$E_{T(t)} = \int_0^t \int_{T_g}^{\Phi \hat{T}(t)+T_i} S(T, t) dT \, d \ln t \quad (16)$$

From Equation 15: if the sintered states are equal ($S_{\hat{T}=0}=S_{T(t)}$) the sintering energies can be equated ($E_{\hat{T}=0}=E_{T(t)}$). Therefore:

$$\alpha e^{\beta S(T,t)} = \int_0^t \int_{T_g}^{\Phi \hat{T}(t)+T_i} S(T, t) dT \, d \ln t \quad (17)$$

The Φ parameter is varied until the transient and steady state sintering energies are equal as shown in FIG. 27.

When the correct Φ is chosen the equation is satisfied and the full thermal history can be calculated using Equation 18 and the results are compared to the steady state lookup table and thermocouple data (FIG. 28).

$$\bar{T}(t) = \Phi \hat{T}(t) + T_i \quad (18)$$

The thermocouple records temperature in real time and indicates the maximum temperature was 660° C. The thermal paint lookup table (steady state model) claims the maximum temperature was 621° C. but gives no other information. The transient thermal paint model asserts the maximum temperature was 657° C. and follows a path nearly identical to that of the thermocouple. By observing the final state of the thermal paint and knowing information regarding the temperature path, the thermal history can be recovered. A complete flowchart for using the transient sintering energy model is shown in FIG. 31.

Thermocouples are currently the gold standard in terms of temperature measurement; however, thousands of measurements would be required to fully a profile temperature map. Using the approach discussed within, a few thermocouples at locations of high interest surrounded by thermal paints can give high-resolution thermal history data over surfaces that are not accessible. Technicians will find instrumentation of the engine to be simplified while engineers will see an increase in high-resolution temperature data.

Activation Energy

The logarithm of densification versus inverse temperature yields an Arrhenius plot used to determine the activation energy. The GL-1705 activation energy was calculated by measuring densification as a function of inverse temperature with results shown in FIG. 29.

The activation energy for GL-1705 was determined to be 475.9 kJ/mol in agreement with predictions in previous sintering discussion for similar glass ceramic systems.

Sintering Energy

As discussed above, viscous flow sintering is an exponential function of temperature and a power or logarithmic function of time. Therefore, the sintering energy (Eqn. 9) must reflect these facts in the results.

Sintering energy as function of (a) temperature for various times and (b) as function of time for various temperatures.

As shown in FIGS. 30A-30B, sintering energy increases exponentially with temperature, as a power function of time, and begins at the glass transition temperature. These results with the activation energy give confidence to the sintering energy model.

SiC—SiC Ceramic Matrix Composites (CMC's)

In a second exemplary embodiment, glass powders are selected to match the CTE of SiC—SiC CMC's.

Formulation and Methodology

The glass powder mixtures used in this research were acquired from commercially available sources. Glass powders are selected with similar coefficients of thermal expansion (CTE) to that of the SiC—SiC ceramic matrix composite (CMC) substrates to which they were applied. In total, three glass powders were selected for use in the present embodiment.

The SiC—SiC CMC substrates were prepared by polishing using 800 grit SiC paper to clean the surface for the application of the thermal paint. After polishing, the samples were cleaned with DI water to remove particles and further cleaned in 91% isopropyl alcohol.

The thermal paint was created by mixing 5 g of glass powder, 1 mL of DI water, and 3 mL of 2% wt. methocell solution and this mixture was vigorously shaken for 5 minutes. The compositions of the thermal paints as they are applied to the SiC—SiC CMC are given in Table 2-1.

TABLE 2-1

Chemical compositions of the URI thermal paints (SiC—SiC CMC)

| Composition [weight %] | Thermal Paint | | |
|---|---|---|---|
| | URI-TP-665 | URI-TP-835 | URI-TP-990 |
| $SiO_2$ | 6.69 | 19.45 | 23.99 |
| $Al_2O_3$ | 17.4 | 1.54 | 20.64 |
| SrO | 9.81 | — | — |
| $B_2O_3$ | 21.67 | — | — |
| CaO | — | 8.44 | 3.52 |
| BaO | — | 26.14 | — |
| MgO | — | — | 7.42 |
| $H_2O$ | 11.11 | 11.11 | 11.11 |
| METHOCELL | 33.32 | 33.32 | 33.32 |

After polishing, substrates were placed on a hot plate set at 75° C. and allowed to heat up for 15 minutes before painting. The thermal paint was loaded into a spray gun and applied to the substrate over the course of three to four passes.

The water and Methocell aid in the adhesion of the thermal paint to the surface of the substrate. However, these two constituents must be removed before testing as placing painted samples with residual amounts of water and Methocell showed to cause ruptures in the paint. These ruptures were from the chemical species boiling at a high rate when exposed to elevated temperatures. To ensure all of the water and organic binder were evaporated from the substrate before testing, the samples were placed in a Thermolyne FB1415M box furnace where a preset binder burnout program ramped the temperature at a rate of 3° C./min until a temperature 250° C. below the listed glass transition temperature of the glass powder was reached and was held at this temperature for three hours.

CMC coupons were tested in a MELLEN PS105-120-15-s tube furnace. The furnace was set to a predetermined temperature with a Type K thermocouple placed next to the coupon. The temperature was tracked using a PDaq 54 and once the desired temperature was reached, the painted SiC—SiC coupon and a Type K thermocouple were placed near the coupon in the furnace. Upon reaching the desired conditions for a test (time/temperature), the coupon was immediately removed from the furnace and left on a fire brick to cool in air.

After the exposed painted coupon was cooled to room temperature on a fire brick, they were examined using UV-VIS reflectance spectroscopy. Spectroscopy was performed using an Ocean Insight STS-VIS spectrometer, an Ocean Insight HL-2000-HP Light Source, and an Ocean Insight QR400-7-VIS-NIR reflection/backscatter probe. Using OceanInsight software, reflectance spectroscopy was performed whereby the baseline for readings was 100% reflectivity, set after binder burnout and 0% reflectivity was set using a closed shutter. To ensure the proper application of thermal paint to the substrates, a coupon was set aside as a baseline for comparison.

Qualitative Results

Experimental testing of three different thermal paints revealed that an optical transition occurred over a temperature range of 10's of degrees Celsius. Each thermal paint had a unique range of temperatures for which the optical transition occurred. This was due to selecting glass powders with glass transition temperatures 100's of degrees Celsius apart from one another.

For temperatures within the optical transition temperature range, the paint changed in appearance from white to gray to black while maintaining a powder-like, matte finish or texture. When increasing the temperature, beyond the point when the thermal paint appeared black and matte, the paint began to transition from black to transparent. The thermal paints initially appeared white and powder-like and had no visual changes for temperatures below the specified optical transition range. After exposure beyond the upper limit of the optical transition range, a transparent glassy film was observed whereby exposure to further increases in temperature did not produce any optical change. The observed optical transition ranges of the thermal paints for an exposure time of 30-minutes are shown in FIG. 32 for thermal paints URI-TP-665 (a), URI-TP-835 (b), and URI-TP-990 (c).

Glass-powder-based thermal paints show a logarithmic shift in the transition temperature ranges based on exposure time. To understand the effects of time on the detectable temperature range of the thermal paints developed here, 9-time intervals were tested. These times varied from 0.25 hours to 64 hours based on a log 2 scale. Qualitatively, it was observed that the optical transition range decreased with increasing time. FIG. 33 shows the optical transition temperature ranges for exposure times of 30-minutes, 4-hours, and 32-hours.

Quantitative Results

When gathering isochronal data for coupons across the range of transition temperatures, it was noticed that reflectivity correlated to visual observations. When the thermal paint changed in appearance from white to gray to black the reflectivity decreased from 100% to approximately 20%-25% depending on the specific thermal paint. A further increase in temperature, beyond the point of reaching a visually black color, produced an increase in reflectivity. The increase in reflectivity occurred when the glass coating changed in opacity from powder-like in appearance to a reflective surface. The reflectivity increased and then surpassed the baseline reflectivity once the glass sintered, and a clear glass film resulted. Beyond this point, reflectivity varied widely for specific temperatures and was not useful.

Plotting the reflectivity vs. temperature over the range at which an optical transition occurred for the 3 thermal paints and 9 different exposure times generated 27 graphs. It was noticed that for each thermal paint, the characteristics of each of the 9 exposure times were almost identical. The only difference was a shift in the range of temperatures over which the transition occurred. This shift was dependent on the time at which samples were exposed and shifted logarithmically. The graphs for each thermal paint were normalized with respect to their temperature to create an average graph. To normalize temperature, the temperature at which the black glass was observed was referred to as the optical transition temperature. At a specific time, the optical transition temperature was the temperature where the thermal paint appeared black and powder-like. Additionally, it is the highest temperature where the thermal paint appeared powder-like before it transitioned to a glass film. Shown in FIGS. 34A-34C are the averaged graphs for URI-TP-665 (a), URI-TP-835 (b), and URI-TP-990 (c) where each characteristic graph describes the relationship between reflectivity and temperature over the range of detectable temperatures for a specified testing time.

In addition, the relationship between exposure time on the temperature range of each thermal paint was needed. The normalized reflectivity vs. temperature graphs shown in FIGS. 34A-34C yield a temperature range for each thermal paint but rely on a specified testing time to determine absolute temperature results. The relationship between the shift in temperature and time was logarithmic as expected according to the literature. Using the isochronal reflectivity vs. temperature graphs created for each specific paint, the optical transition temperature was recorded and plotted on a semi-log plot of optical transition temperature vs. exposure time as shown in FIG. 35. The relation between the shift in optical transition temperature and time yields characteristic equations for each thermal paint (FIG. 35).

Temperature-Time-Reflectivity Surfaces

By plotting the data shown in FIG. 33 on an XZ plane that follows logarithmic behavior on optical transition temperature on an XY plane (FIG. 35), a 3D surface was generated (FIG. 36). This 3D Temperature-Time-Reflectivity surface generated a look-up table, unique to an individual thermal paint. By inputting any two variables (temperature, time, and reflectivity) the third was output from the 3D surface.

For validation of the 3D Temperature-Time-Reflectivity surface, coupons were exposed to a temperature within their detectable temperature range for a known or specified time. The purpose was to compare the temperature calculated from the 3D surface to that measured by a thermocouple. Results from several test coupons are shown in FIG. 37. By inputting exposure time, reflectivity, and transition state (powder or glassy) for a given thermal paint an output temperature was generated. The results from the 3D surfaces were compared to those of Type K thermocouple and varied by a few degrees Celsius.

Pixelation and Heat Mapping

In addition to high resolution, the ability to use thermal paints over a wide range of temperatures was investigated. Individual thermal paints developed for this research have a detectable temperature range limited to 10's of degrees Celsius. To achieve both a wide detectable temperature range and high resolution, pixelation of thermal paints was performed to achieve the desired characteristics. A pixel of thermal paint was created by applying multiple thermal paints in close proximity to one another over the surface of a substrate. Once the pixels were applied, each thermal paint pixel could undergo a number of individual transitions.

Using the same spectroscopy specifications as previously mentioned, the minimum usable spot size of a single circular subpixel of thermal paint was 15.21 mm$^2$. Spacing between the edges of adjacent subpixels was 0.6 mm. For single thermal paint subpixel test, a 2×2 array of subpixels composed of the same thermal paint was applied to the SiC—SiC CMC substrate. For these experiments, each pixel was composed of 4 subpixels using the same thermal paint. Results of these initial tests demonstrated the subpixel's ability to achieve accurate, precise, and reproducible results.

In FIGS. 38A-38C, photographs of CMC coupons after exposure are on the left side of each figure, and the corresponding temperature profiles are shown on the right-hand side where each subpixel was assigned a temperature value using the 3D surfaces. To ensure the accuracy of these results, a Type K thermocouple was placed in the furnace next to the coupon during testing. The data gathered from coupons was input into the MATLAB code, shown in FIG. 39, and the temperatures were compared to those of the Type K thermocouple. These experiments demonstrated the reproducibility of the output temperatures were within a few degrees Celsius of the Type K thermocouple. Subpixels with spectra corresponding to temperatures above or below the detectable temperature range have a gray appearance and have no associated value as shown in FIG. 38C. The sample in FIG. 38C was tested at temperatures below the detectable temperature range. The data gathered from spectroscopy and interpreted by the code determined that the exposure temperature was not quantifiable using the corresponding thermal paint.

Once single-thermal paint pixelation experiments were shown to produce acceptable results, pixelation using multiple thermal paints on a single CMC substrate was performed. The same mask that was described earlier in this section was used. The spraying pattern of the substrates changed to that shown in 7. Since each pixel was composed of 2 or 3 different thermal paints, the temperature detection range for these tests was increased. Having each thermal paint (subpixel) individually applied within each pixel allows each thermal paint to have its own unique resolution while broadening the overall detectable temperature range.

In FIG. 41 two thermal paints were applied to a CMC substrate using the spray pattern shown in FIG. 40A. In FIG. 42, three thermal paints were applied to a CMC coupon using the spray pattern in FIG. 40B. To ensure the results were accurate, a Type K thermocouple was placed in the furnace alongside the coupons during testing. The data gathered from the CMC coupons were input into the MATLAB code shown in FIG. 43, where the temperature was compared to that of the Type K thermocouple. When spectroscopy data was related to temperatures outside the detectable temperature range for a corresponding paint, the code drew a gray square for the corresponding subpixel Similar to the glass-powder-based thermal paints developed above, the glass-powder-based thermal paints developed here underwent an observable optical transition. These qualitative results of exposure to temperature were noticed when the paint changed colors from its initial white color to gray and then black while appearing as a powder. Increasing the temperature further caused the thermal paint's opacity to change, resulting in a transition where appearance changed from powder-like to a reflective glassy film.

Based on the quantitative analysis performed by UV-VIS spectroscopy, the independent relationships between reflectivity and temperature and the shift in optical transition temperature and time led to the creation of 3D Temperature-Time-Reflectivity surfaces. The creation of a 3D surface allowed the user to input time and reflectivity with temperature as an output. Where these thermal paints outperform others is in their accuracy and precision. When compared to Type K thermocouple data, the results from the thermal paint differed only by a few degrees Celsius.

When pixelated, the thermal paints became a paint system whose transition temperature range was increased while maintaining accuracy and precision. Additional thermal paints can be developed, analyzed, and added to the existing library of thermal paints thus expanding the available range of thermal paints for future application.

The present disclosure thus provides for the development of high-resolution passive wireless temperature sensors that can operate in the hot section of gas-turbine engines was the focus. The temperature indicating paints (thermal paints) function up to 900° C. yielding a qualitative optical transition to determine local hot and cold spots and general temperature gradients on the surfaces of engine components. UV:VIS spectroscopy can quantitively track this transition increasing resolution to an average of 5° C. and upwards of 3° C. Multiple thermal paints can be pixelated to cover a wide range of temperatures while maintaining the high resolution the individual paints offer. The paints have excellent adhesion to nickel-based superalloys due to the matching coefficient of thermal expansion between the paint and substrate.

Experiments show the paints function as temperature indicators for times up to 60 hours. SEM, optical microscopy, and spectroscopy results confirmed the sintering mechanism and its effects on pore size and pore size distribution being responsible for the observed optical transition beginning at the glass transition temperature ($T_g$).

These temperature indicating paints benefit further by rastering the UV:VIS spectrometer in an automated gantry over engine components to generate quantitative surface temperature maps for direct comparison to computational fluid dynamics and heat transfer models. Designers with access to high-resolution experimental surface temperature maps can use this knowledge to develop the higher preforming, more efficient, and reliable engines of tomorrow.

The embodiments disclosed herein have been discussed for the purpose of familiarizing the reader with the novel aspects of the invention. Although exemplary embodiments of the invention have been shown, many changes, modifications and substitutions may be made by one of ordinary skill in the art without necessarily departing from the spirit and scope of the invention as described in the following claims.

NOMENCLATURE

| | | | |
|---|---|---|---|
| A | Reflectivity polynomial parameter | CTE | Coefficient of thermal expansion |
| $A_0$ | Sintering densification | a | Sintered state temperature parameter |
| B | Reflectivity polynomial parameter | b | Sintered state temperature parameter |
| E | Sintering Energy | c | Sintered state time parameter |
| $E_a$ | Activation Energy | d | Sintered state time parameter |
| $E_{\hat{T}=0}$ | Steady state sintering energy | $l_0$ | Initial thickness |
| $E_{T(t)}$ | Transient sintering energy | $\Delta l$ | Change in thickness |
| K | Arrhenius constant | m | Sintering rate constant |
| R | Universal gas constant | n | Reflectivity polynomial parameter |
| R* | Minimum reflectivity | r | Glass particle radius |
| S | Sintered state [0 1] | t | Time |
| $S_{\hat{T}=0}$ | Steady state sintered state | $\alpha$ | Sintering energy constant |
| $S_{T(t)}$ | Transient sintered state | $\beta$ | Sintering energy constant |
| T | Temperature | $\gamma$ | Sintering energy constant |
| $T_g$ | Glass transition temperature | $\gamma_s$ | Surface energy |
| $T_i$ | Initial temperature | $\delta$ | Sintering energy constant |
| $T_o$ | Optical transition temperature | $\zeta$ | Sintering energy constant |
| $T_s$ | Softening temperature | $\mu$ | Viscosity |
| $\bar{T}$ | Normalized temperature | $\eta$ | Sintering energy constant |
| $\hat{T}$ | Shape of temperature curve | $\Phi$ | Scaling parameter |

What is claimed is:

1. A thermal paint system for sensing a maximum exposed temperature on a surface to which the paint is applied, said surface having a known Coefficient of Thermal Expansion (CTE), said system comprising:
   a thermal paint comprising:
      a glass-ceramic powder having a predetermined CTE which matches the CTE of the surface and a predetermined glass transition temperature (Tg) and a known sintering range;
      a binder; and
      a solvent; and
   a UV:VIS spectrometer configured with a visible spectrum probe for measuring a surface reflectivity of the thermal paint in the visible spectrum.

2. The system of claim 1 further comprising:
   a data library including baseline visible reflectance spectra of said thermal paint at known temperatures; and
   a computer assisted comparison system running an algorithm for comparing said measured surface reflectivity with said data library and determining a sensed temperature.

3. The system of claim 1 further comprising:
   a gantry system for automated movement of said probe over said surface.

4. The system of claim 2 further comprising:
   a gantry system for automated movement of said probe over said surface.

5. The system of claim 1 wherein said thermal paint comprises a library of at least two thermal paints having different Tg.

6. The system of claim 5 wherein a plurality of thermal paints are applied in a pixelated pattern on said surface to provide an expanded temperature sensing range.

7. The system of claim 2 wherein said thermal paint comprises a library of at least two thermal paints having different Tg.

8. The system of claim 7 wherein a plurality of thermal paints are applied in a pixelated pattern on said surface to provide an expanded temperature sensing range.

9. The system of claim 3 wherein said thermal paint comprises at least two thermal paints having different Tg.

10. The system of claim 9 wherein a plurality of thermal paints are applied in a pixelated pattern on said surface to provide an expanded temperature sensing range.

11. The system of claim 4 wherein said thermal paint comprises at least two thermal paints having different Tg.

12. The system of claim 11 wherein a plurality of thermal paints are applied in a pixelated pattern on said surface to provide an expanded temperature sensing range.

13. The system of claim 1 further comprising a thermocouple placed on the surface,
   wherein thermocouple temperature data is recorded and normalized, and said normalized temperature data is utilized to determine a thermal history of said thermal paint using a transient sintering energy equation.

14. The system of claim 2 further comprising a thermocouple placed on the surface,
   wherein thermocouple temperature data is recorded and normalized, and said normalized temperature data is utilized to determine a thermal history of said thermal paint using a transient sintering energy equation.

* * * * *